United States Patent
Hergenrother et al.

(10) Patent No.: US 6,342,552 B1
(45) Date of Patent: Jan. 29, 2002

(54) PROCESSABILITY OF SILICA-FILLED RUBBER STOCKS

(75) Inventors: William L. Hergenrother, Akron; Ashley S. Hilton, Massillon; William M. Cole, Clinton; James Oziomek, Cuyahoga Falls, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/723,674

(22) Filed: Nov. 28, 2000

Related U.S. Application Data

(60) Division of application No. 09/203,438, filed on Dec. 1, 1998, and a continuation-in-part of application No. 08/985,859, filed on Dec. 5, 1997, which is a continuation-in-part of application No. 08/893,864, filed on Jul. 11, 1997, now Pat. No. 6,221,943, which is a continuation-in-part of application No. 08/893,875, filed on Jul. 11, 1997.

(51) Int. Cl.$^7$ .............. C08K 5/24; C08K 5/10; B60C 9/00
(52) U.S. Cl. .......... 524/264; 524/318; 152/548; 152/564
(58) Field of Search .............. 524/318, 265; 152/548, 564

(56) References Cited

U.S. PATENT DOCUMENTS

| | | | |
|---|---|---|---|
| 3,627,723 A | 12/1971 | Kealy et al. | 260/41.5 R |
| 3,717,600 A | 2/1973 | Dalhuisen et al. | 260/23 H |
| 3,737,334 A | 6/1973 | Doran | 106/288 Q |
| 3,768,537 A | 10/1973 | Hess et al. | 152/330 |
| 3,873,489 A | 3/1975 | Thurn | 260/33.6 AQ |
| 3,881,536 A | 5/1975 | Doran, Jr. et al. | 152/330 |
| 3,884,285 A | 5/1975 | Russell et al. | 152/330 R |
| 3,923,712 A | 12/1975 | Vickery | 260/28.5 B |
| 3,938,574 A | 2/1976 | Burmester et al. | 152/330 R |
| 3,978,103 A | 8/1976 | Meyer-Simon et al. | 260/448.8 R |
| 4,029,513 A | 6/1977 | Vessey et al. | 106/482 |
| 4,076,550 A | 2/1978 | Thurn et al. | 106/29 Q |
| 4,143,027 A | 3/1979 | Sollman et al. | 260/42.15 |
| 4,179,537 A | 12/1979 | Rykowski | 427/387 |
| 4,201,698 A | 5/1980 | Itoh et al. | 260/3 |
| 4,229,333 A | 10/1980 | Wolff et al. | 260/213.7 M |
| 4,297,145 A | 10/1981 | Wolff et al. | 106/308 Q |
| 4,431,755 A | 2/1984 | Weber et al. | 523/203 |
| 4,433,013 A | 2/1984 | Pühringer | 427/337 |
| 4,436,847 A | 3/1984 | Wagner | 523/203 |
| 4,463,120 A | 7/1984 | Collins et al. | 524/274 |
| 4,474,908 A | 10/1984 | Wagner | 523/213 |
| 4,482,657 A | 11/1984 | Fischer et al. | 523/334 |
| 4,623,414 A | 11/1986 | Collins et al. | 156/307.5 |
| 4,629,758 A | 12/1986 | Kawaguchi et al. | 524/495 |
| 4,906,680 A | 3/1990 | Umeda et al. | 524/183 |
| 4,937,104 A | 6/1990 | Pühringer | 427/344 |
| 5,057,601 A | 10/1991 | Schiessl et al. | 528/483 |
| 5,066,721 A | 11/1991 | Hamada et al. | 525/102 |
| 5,159,009 A | 10/1992 | Wolff et al. | 524/495 |
| 5,178,676 A | 1/1993 | Lackey et al. | 106/287.14 |
| 5,227,425 A | 7/1993 | Rauline | 524/493 |
| 5,227,431 A | 7/1993 | Lawson et al. | 525/237 |
| 5,328,949 A | 7/1994 | Sandstrom et al. | 524/262 |
| 5,336,730 A | 8/1994 | Sandstrom et al. | 525/332.6 |
| 5,426,136 A | 6/1995 | Waddell et al. | 523/200 |
| 5,502,131 A | 3/1996 | Antkowiak et al. | 526/180 |

(List continued on next page.)

FOREIGN PATENT DOCUMENTS

| | | |
|---|---|---|
| CA | 2177095 | 5/1996 |
| CA | 2184932 | 3/1997 |
| CA | 2242310 | 1/1999 |
| CA | 2242383 | 1/1999 |
| CA | 2242783 | 1/1999 |
| CA | 2242797 | 1/1999 |
| CA | 2242800 | 1/1999 |
| CA | 2242801 | 1/1999 |
| CA | 2243091 | 1/1999 |
| CH | 299373 | 8/1954 |
| DE | 29 05 977 A | 8/1979 |
| EP | 0 447 066 | 9/1991 |
| EP | 0 510 410 | 10/1992 |
| EP | 0 754 710 | 1/1997 |
| EP | 0 765 904 | 4/1997 |
| EP | 0 767 179 | 4/1997 |
| EP | 0 890 580 | 1/1999 |
| EP | 0 890 587 | 1/1999 |
| EP | 0 890 588 | 1/1999 |
| EP | 0 890 602 | 1/1999 |
| EP | 0 890 603 | 1/1999 |
| EP | 0 890 606 | 1/1999 |
| EP | 0 908 586 | 1/1999 |
| JP | 63-213536 | 9/1988 |
| JP | 5-51484 | 3/1993 |
| WO | WO 99/02601 | 1/1999 |

*Primary Examiner*—Peter D. Mulcahy
(74) *Attorney, Agent, or Firm*—John H. Nornickel; Barbara Arndt

(57) ABSTRACT

The present invention provides silica-filled, vulcanized elastomeric compounds comprising an elastomer mixed with at least a silica filler, a processing aid, and a curing agent, and processes for the preparation of the same. Generally, the present invention provides processing aids which effectively reduce or replace the amount (i.e., about 10 percent by weight based upon the silica filler) of the processing aid bis[3-triethyoxysilyl)propyl]tetrasulfide ("Si69") used in the production of silica-filled rubber stocks. These new processing aids include alkyl alkoxysilanes, fatty acid esters of hydrogenated and non-hydrogenated sugars and the polyoxyethylene derivatives thereof, and combinations thereof, with or without various non-reinforcing fillers such as mineral fillers. The processing aids do not hinder the physical properties of the compounds and have been found to be excellent substitutes for Si69. The processing aids may be supported on the silica filler or any of the other fillers employed in the composition for improved handling, safety and performance. Processes for the preparation of the silica filled vulcanizable elastomers are provided as well as pneumatic tires employing tread stock comprising the novel vulcanizable elastomers.

17 Claims, 1 Drawing Sheet

U.S. PATENT DOCUMENTS

| | | | |
|---|---|---|---|
| 5,508,333 A | 4/1996 | Shimizu | 524/424 |
| 5,514,756 A | 5/1996 | Hsu et al. | 525/332.5 |
| 5,521,309 A | 5/1996 | Antkowiak et al. | 540/612 |
| 5,552,473 A | 9/1996 | Lawson et al. | 524/575 |
| 5,569,697 A | 10/1996 | Ferrandino et al. | 524/492 |
| 5,574,109 A | 11/1996 | Lawson et al. | 525/280 |
| 5,580,919 A | 12/1996 | Agostini et al. | 524/430 |
| 5,591,794 A | 1/1997 | Fukumoto et al. | 524/447 |
| 5,610,221 A | 3/1997 | Waddell et al. | 524/492 |
| 5,610,227 A | 3/1997 | Antkowiak et al. | 524/572 |
| 5,610,237 A | 3/1997 | Lawson et al. | 525/280 |
| 5,616,655 A | 4/1997 | D'Sidocky et al. | 525/342 |
| 5,659,056 A | 8/1997 | Hergenrother et al. | 556/401 |
| 5,674,932 A | 10/1997 | Agostini et al. | 524/430 |
| 5,679,728 A | 10/1997 | Kawazura et al. | 523/215 |
| 5,686,523 A | 11/1997 | Chen et al. | 524/547 |
| 5,708,053 A | 1/1998 | Jalics et al. | 523/200 |
| 5,717,022 A | 2/1998 | Beckmann et al. | 524/493 |
| 5,719,207 A | 2/1998 | Cohen et al. | 524/213 |
| 5,723,531 A | 3/1998 | Visel et al. | 524/496 |
| 5,741,858 A | 4/1998 | Brann et al. | 525/101 |
| 5,763,388 A | 6/1998 | Lightsey et al. | 523/212 |
| 5,777,013 A | 7/1998 | Gardiner et al. | 524/274 |
| 5,780,537 A | 7/1998 | Smith et al. | 524/493 |
| 5,780,538 A | 7/1998 | Cohen et al. | 524/494 |
| 5,798,419 A | 8/1998 | Quiteria et al. | 525/370 |
| 5,804,636 A | 9/1998 | Nahmias et al. | 524/492 |
| 5,804,645 A | 9/1998 | Matsuo | 524/575 |
| 5,866,650 A | 2/1999 | Lawson et al. | 524/572 |
| 5,872,171 A | 2/1999 | Detrano | 524/492 |
| 5,872,176 A | 2/1999 | Hergenrother et al. | 524/494 |
| 5,872,178 A | 2/1999 | Kansupada et al. | 524/496 |
| 5,872,179 A | 2/1999 | Hubbell | 524/526 |
| 5,877,249 A | 3/1999 | Lambotte | 524/493 |
| 5,883,179 A | 3/1999 | Kawazoe et al. | 524/492 |
| 5,886,074 A | 3/1999 | Sandstrom et al. | 524/291 |
| 5,886,086 A | 3/1999 | Hubbell et al. | 524/526 |
| 5,898,047 A | 4/1999 | Howland et al. | 152/209 R |
| 5,912,374 A | 6/1999 | Agostini eet al. | 556/9 |
| 5,914,364 A | 6/1999 | Cohen et al. | 524/494 |
| 5,916,951 A | 6/1999 | Nahmias et al. | 524/492 |
| 5,916,961 A | 6/1999 | Hergenrother et al. | 524/572 |
| 5,916,973 A | 6/1999 | Zimmer et al. | 525/236 |
| 5,929,149 A | 7/1999 | Matsuo et al. | 524/262 |
| 6,008,295 A | 12/1999 | Takeichi et al. | 525/105 |
| 6,022,922 A | 2/2000 | Bergh et al. | 524/492 |
| 6,046,266 A | 4/2000 | Sandstrom et al. | 524/492 |
| 6,053,226 A | 4/2000 | Agostini | 152/209.5 |
| 6,080,809 A | 6/2000 | Stuhldreher | 524/447 |

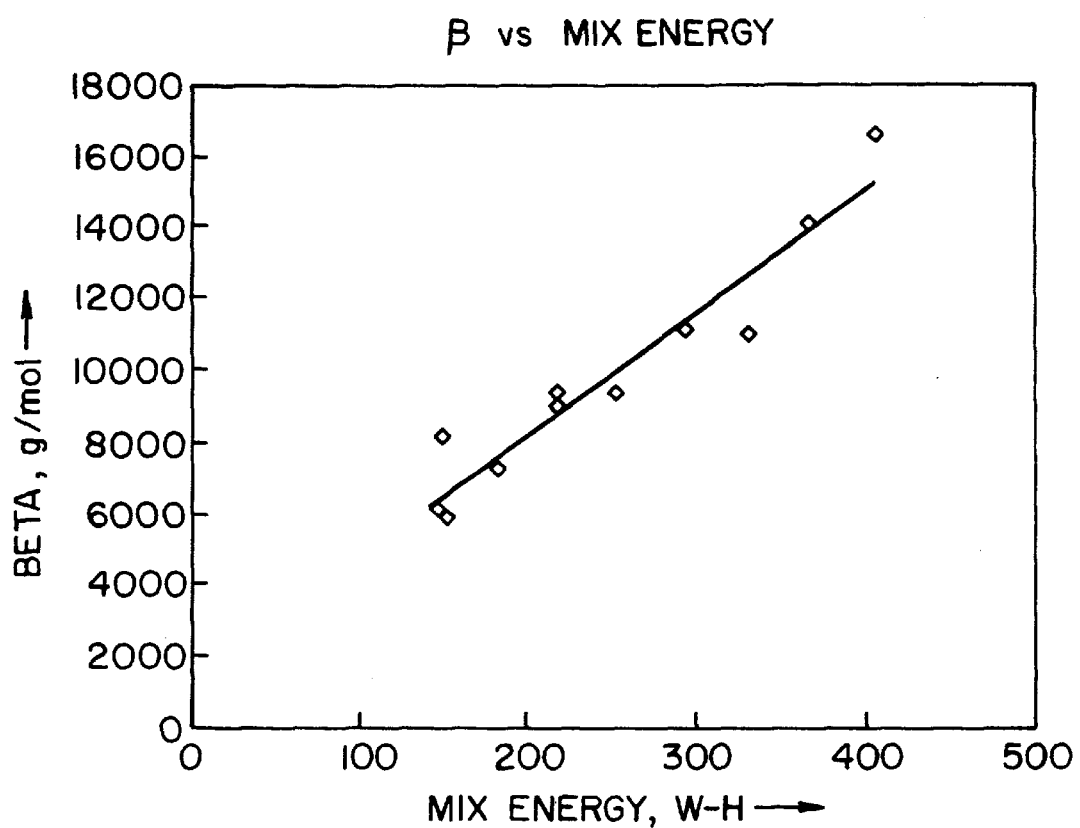

PROCESSABILITY OF SILICA-FILLED RUBBER STOCKS

CROSS-REFERENCE TO RELATED APPLICATIONS

This application is a divisional of U.S. Ser. No. 09/203,438, filed on Dec. 1, 1998, which is a continuation-in-part of U.S. Ser. No. 08/893,864 filed Jul. 11, 1997 now U.S. Pat. No. 6,221,943, and of U.S. Ser. No. 08/985,859, filed Dec. 5, 1997, which is a continuation-in-part of U.S. Ser. No. 08/893,875, filed Jul. 11, 1997.

TECHNICAL FIELD

The present invention relates to the processing and vulcanization of diene polymer and copolymer elastomer-containing rubber stocks. More particularly, the present invention relates to the processing and vulcanization of diene polymer and copolymer elastomer-containing, silica-filled rubber stocks using processing aids selected from the group consisting of alkyl alkoxysilane, fatty acid esters of hydrogenated and non-hydrogenated sugars and the polyoxyethylene derivatives thereof, and combinations and mixtures of these processing aids, with or without other reinforcing fillers, e.g., carbon black, or non-reinforcing fillers, e.g., mineral fillers. The present invention further relates to the processing and vulcanization of diene polymer and copolymer elastomer-containing, silica-filled rubber stocks using the above processing aids supported on the silica filler or other reinforcing or non-reinforcing fillers prior to mixing with the elastomer.

BACKGROUND OF THE INVENTION

In the art it is desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lower fuel consumption for vehicles using such tires.

In such contexts, the property of lowered hysteresis of compounded, vulcanizable elastomer compositions is particularly significant. Examples of such compounded elastomer systems are known to the art and typically include at least one elastomer (that is, a natural or synthetic polymer exhibiting elastomeric properties, such as a rubber), a reinforcing (or non-reinforcing) filler agent (such as finely divided carbon black, thermal black, or mineral fillers such as clay and the like) and a vulcanizing system such as a sulfur-containing vulcanizing (i.e., curing) system.

Recently, precipitated silica has been increasingly used as a reinforcing particulate filler in carbon black-filled rubber components of tires and mechanical goods. While providing excellent properties, including reduced hysteresis, to the rubber stocks, these silica-loaded rubber stocks are unfortunately not easily produced, exhibiting relatively poor processability characteristics.

Previous attempts at preparing readily processable, vulcanizable, silica-filled rubber stocks containing natural rubber or diene polymer and copolymer elastomers have focused upon the sequence of adding ingredients during mixing (Bomal, et al., Influence of Mixing procedures on the Properties of a Silica Reinforced Agricultural Tire Tread, May 1992), the addition of de-agglomeration agents such as zinc methacrylate and zinc octoate, or SBR-silica coupling agents such as mercapto propyl trimethoxy silane (Hewitt, Processing Technology of Silica Reinforced SBR, Elastomerics, pp 33–37, March 1981), and the use of bis[3-(triethoxysilyl)propyl]tetrasulfide (Si69) processing aid (Degussa, PPG).

The use of Si69 processing aid in the formulation of silica-filled rubber stocks has been successful in providing more readily processable rubber stocks. Disadvantageously, however, is the fact that, in order to obtain the desired processing results, a relatively large amount of the processing additive, on the order of at least 10 percent by weight based on the weight of silica, is required in order to be effective.

Thus, it is believed highly desirable to provide formulations for the processing and vulcanization of diene polymer and copolymer elastomer-containing, silica-filled rubber stocks which include processing aids other than Si69 that are effective in improving the processability and properties of the resulting silica-filled products. To that end, the present invention provides alkyl alkoxysilanes, fatty acid esters of hydrogenated and non-hydrogenated sugars, and mixtures thereof, for use as processing aids for silica-filled rubber stocks, which greatly improves the processability and properties of the formulations and the resulting vulcanized product, particularly where these processing aids are supported on silica or another reinforcing or non-reinforcing filler prior to being mixed with the elastomer. In addition, it has been found that mineral fillers as used in silica-filled elastomeric rubber stocks further improving tear strength and lower hysteresis, and can also be supported on silica or another filler.

SUMMARY OF THE INVENTION

It is, therefore, an object of the present invention to provide processing aids which improve the processability of formulations of diene polymer elastomers reinforced with silica filler.

It is another object of the present invention to provide formulations of diene polymer elastomers reinforced with silica filler having improved processability with decreased levels of bis[34triethoxysilyl)propyl]tetrasulfide (Si69).

It is still another object of the present invention to provide mineral and non-mineral fillers which improve the processability of formulations of diene polymer elastomers reinforced with silica filler.

It is a further object of the present invention to provide silica-supported, carbon black-supported or mineral filler-supported processing aids which improve the processability of formulations of diene polymer elastomers reinforced with silica filler.

It is still a further object of the present invention to provide reinforcing filler-supported additives, such as a mineral fillers, capable of improving the processability of the formulations of diene polymer elastomers reinforced with silica filler.

It is yet a further object of the present invention to provide a process for improving the processability of formulations of diene polymer elastomers reinforced with silica filler.

It is still a further object of the present invention to provide a process for reducing the viscosity of silica-filled elastomeric vulcanizable compounds.

It is yet a further object of the present invention to provide a process for decreasing the level of bis[3-(triethoxysilyl) propyl]tetrasulfide (Si69) in silica-filled elastomeric vulcanizable compounds.

It is still a further object of the present invention to provide vulcanizable silica-filled elastomeric compounds having enhanced physical properties, including decreased hysteresis and increased tear strength.

At least one or more of the foregoing objects, together with the advantages thereof over the existing art, which shall become apparent from the specification which follows, are accomplished by the invention as hereinafter described and claimed.

The present invention provides a process for the preparation of a silica-filled, vulcanized elastomeric compound comprising the steps of mixing an elastomer with from about 1 to about 100 parts by weight of an amorphous silica filler, from 0 to about 20 percent by weight, based on said silica filler, of bis[3-(triethoxysilyl)propyl]tetrasulfide, from about 0.1 to about 150 percent by weight, based on said silica filler, of an alkyl alkoxysilane, and a cure agent; and, effecting vulcanization. Preferably, the elastomer is a diene monomer homopolymer or a copolymer of a diene monomer and a monovinyl aromatic monomer.

The present invention further provides a vulcanizable silica-filled compound comprising an elastomer, a silica filler, from 0 to about 20 percent by weight, based on said silica filler, of bis[3-(triethoxysilyl)propyl]tetrasulfide (Si69), from about 0.1 to about 150 percent by weight, based on said silica filler, of an alkyl alkoxysilane, and a cure agent. Preferably, the elastomer is styrene butadiene rubber, and the compound may optionally contain an additional filler, e.g., carbon black.

The present invention further provides a process for the preparation of a silica-filled, vulcanized elastomeric compound comprising mixing an elastomer with from about 5 to about 100 parts by weight of a reinforcing filler per 100 parts of elastomer, wherein the reinforcing filler is selected from the group consisting of silica filler and mixtures of silica filler and carbon black; from 0 to about 20 percent by weight, based upon the weight of the silica filler, of a bis[3-(triethoxysilyl)propyl]tetrasulfide (Si69); from about 0.1 to about 150 percent by weight, based upon the weight of the silica filler, of a processing aid selected from the group consisting of fatty acid esters of hydrogenated and non-hydrogenated $C_5$ and $C_6$ sugars; polyoxyethylene derivatives of fatty acid esters of hydrogenated and non-hydrogenated $C_5$ and $C_6$ sugars and mixtures thereof; from about 0 to about 40 parts by weight of an additional filler other than silica or carbon black, with the provisos that if the processing aid is sorbitan monooleate, then at least one of the polyoxyethylene derivatives or additional fillers is also present and, that the minimal amount for each processing aid and additional filler, if present, is about one part by weight per 100 parts elastomer; and a cure agent; and, effecting vulcanization.

The present invention further provides a vulcanizable silica-filled compound comprising 100 parts by weight of an elastomer; from about 5 to about 100 parts by weight of a reinforcing filler per 100 parts of elastomer, wherein the reinforcing fillers are selected from the group consisting of silica filler and mixtures of silica filler and carbon black; from 0 to about 20 percent by weight, based upon the weight of the silica filler, of bis[3-triethoxysilyl)propyl]tetrasulfide (Si69); from about 0.1 to about 150 percent by weight, based upon the weight of the silica filler, of a processing aid selected from the group consisting of fatty acid esters of hydrogenated and non-hydrogenated $C_5$ and $C_6$ sugars; polyoxyethylene derivatives of fatty acid esters of hydrogenated and non-hydrogenated $C_5$ and $C_6$ sugars and mixtures thereof; from about 0 to about 40 parts by weight of an additional filler other than silica or carbon black, with the provisos that if the processing aid is sorbitan monooleate, then at least one of the polyoxyethylene derivatives or additional fillers is also present and, that the minimal amount for each processing aid and additional filler, if present, is about one part by weight; and a cure agent.

The present invention further provides a process for the preparation of a silica-filled, vulcanized elastomeric compound comprising mixing 100 parts by weight of an elastomer with from about 5 to about 100 parts by weight of a reinforcing filler selected from the group consisting of silica filler or mixtures thereof with carbon black, per 100 parts of the elastomer; from about 0.1 to about 150 percent by weight, based on the silica filler, of a processing aid selected from the group consisting of alkylalkoxysilanes, fatty acid esters of hydrogenated and non-hydrogenated $C_5$ and $C_6$ sugars; polyoxyethylene derivatives of fatty acid esters of hydrogenated and non-hydrogenated $C_5$ and $C_6$ sugars and mixtures thereof; from 0 to about 40 parts by weight of a non-reinforcing filler, per 100 parts elastomer; and a cure agent; wherein the processing aid is first mixed with and supported on at least some of either the reinforcing filler or non-reinforcing filler prior to mixing with the elastomer; and effecting vulcanization.

The present invention further provides a silica-filled, vulcanized elastomeric compound comprising 100 parts by weight of an elastomer; about 5 to about 100 parts by weight of a reinforcing filler selected from the group consisting of silica filler or mixtures thereof with carbon black, per 100 parts of the elastomer; from about 0.1 to about 150 percent by weight, based on the silica filler, of a processing aid selected from the group consisting of alkylalkoxysilanes, fatty acid esters of hydrogenated and non-hydrogenated $C_5$ and $C_6$ sugars; polyoxyethylene derivatives of fatty acid esters of hydrogenated and non-hydrogenated $C_5$ and $C_6$ sugars and mixtures thereof; from 0 to about 40 parts by weight of a non-reinforcing filler, per 100 parts elastomer; and a cure agent; wherein the processing aid is supported on at least some of either the reinforcing filler or non-reinforcing filler.

The present invention further provides a pneumatic tire employing tread stock manufactured from the vulcanizable silica-filled compounds of the present invention.

BRIEF DESCRIPTION OF THE DRAWING

The drawing FIGURE is a graph of Beta, an inverse measure of filler association or crosslink density, as a function of mix energy.

DETAILED DESCRIPTION OF THE PREFERRED EMBODIMENTS

In general, the present invention provides a means to reduce the level of Si69 needed to obtain good physical properties in a cured elastomeric stock containing silica as a filler. In addition, the present invention further provides maintenance of the processability of the compounded stock, as measured by Mooney viscosity, at the same level as achieved with high levels of Si69.

In one embodiment of the present invention, an alkyl alkoxysilane is utilized as a silica hydrophobating agent, such that minimal amounts of Si69 are needed to obtain good processability, and yet still give good physical properties. According to the invention, therefore, a less costly silane can be substituted for the majority or all of the Si69 that would be normally used without any loss of processability or properties. Additionally, remilling can be eliminated, and the cure of the rubber stock is not dependent on the high sulfur level present in the Si69.

The silica-hydrophobating agents useful according to the present invention include those alkyl alkoxysilanes of the formula $(R_1)_2Si(OR_2)_2$ or $R_1Si(OR_2)_3$, wherein the alkoxy groups are the same or are different; each $R_1$ independently comprising C1 to about C18 aliphatic, about C5 to about C12 cyclo-aliphatic, or about C6 to about C18 aromatic, preferably C1 to about C10 aliphatic, about C6 to about C10 cyclo-aliphatic, or about C6 to about C12 aromatic; and each $R_2$ independently containing from one to about 6 carbon atoms. Representative examples include octyltriethoxy silane, octyltrimethyloxy silane, (3-glycidoxypropyl) trimethoxy silane, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyldimethyoxy silane, 3-chloropropyltriethoxy silane, methacryoltrimethoxy silane, i-butyltriethoxy silane, and the like. Of these, octyltriethoxysilane is preferred.

Preferably, from about 0.1 to about 150 percent by weight of an alkyl alkoxysilane is used in the present invention. Thus, given the amount of silica filler typically preferred in the subject composition, up to about 150 parts by weight of the processing aid, per 100 parts elastomer, may be used, representing a 60/40 ratio of processing aid to silica.

According to the present invention, the polymerized elastomer, e.g., polybutadiene, polyisoprene and the like, and copolymers thereof with monovinyl aromatics such as styrene, alpha methyl styrene and the like, or trienes such as myrcene, is compounded to-form the rubber stock. Thus, the elastomers include diene homopolymers, A, and copolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinylnaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity ($ML_4/212°$ F.) of from about 2 to about 150. The copolymers are preferably random copolymers which result from simultaneous copolymerization of the monomers, as is known in the art. Also included are non-functionalized cis-polybutadiene, ethylene-propylene-diene monomer (EPDM), emulsion styrene butadiene rubber, and natural rubber.

Initiators known in the art such as an organolithium initiator, preferably an alkyllithium initiator, can be employed to prepare the elastomer. More particularly, the initiators used in the present invention include N-lithiohexamethyleneimine, organolithium compounds such as n-butyllithium, tributyltin lithium, dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2-2'-di(tetrahydrofuryl) propane, dipiperidyl ethane, hexamethylphosphoramide, N-N'-dimethylpiperazine, diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator solution previously described. Alternatively, the monomer and coordinator can be added to the initiator. The procedure is carried out under anhydrous, anaerobic conditions. The reactants are heated to a temperature of from about 10° C. to about 150° C. and are agitated for about 0.1 to about 24 hours. After polymerization is complete, the product is removed from the heat and terminated in one or more ways. To terminate the polymerization, a terminating agent, coupling agent or linking agent may be employed, all of these agents being collectively referred to herein as "terminating agents". Certain of these agents may provide the resulting polymer with a multifunctionality. That is, the polymers of the present invention, can carry at least one amine functional group as discussed hereinabove, and may also carry a second functional group selected and derived from the group consisting of terminating agents, coupling agents and linking agents. Generally, the amount of terminating agent that is employed ranges from about 0.3 and one mole per mole of initiator, with from about 0.5 to about 0.8 moles per mole of initiator being preferred.

Examples of terminating agents according to the present invention include those commonly employed in the art, including hydrogen, water, steam, an alcohol such as isopropanol, 1,3-dimethyl-2-imidazolidinone (DMI), carbodiimides, N-methylpyrrolidine, cyclic amides, cyclic ureas, isocyanates, Schiff bases, 4,4'-bis(diethylamino) benzophenone, and the like. Other useful terminating agents may include those of the structural formula $(R_1)_a ZX_b$, wherein Z is tin or silicon. It is preferred that Z is tin. $R_1$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_1$ may include methyl, ethyl, n-butyl, neophyl, phenyl, cyclohexyl or the like. X is a halogen, such as chlorine or bromine, or alkoxy ($-OR_1$), "a" is from 0 to 3, and "b" is from about 1 to 4; where a+b=4. Examples of such terminating agents include tin tetrachloride, $(R_1)_3SnCl, (R_1)_2 SnCl_2$, $R_1SnCl_3$, and $R_1SiCl_3$ as well as tetraethoxysilane ($Si(OEt)_4$) and methyltriphenoxysilane ($MeSi(OPh)_3$).

When mineral fillers, in addition to silica, are to be used in the vulcanizable compound, it is preferred that the polymer contain a silane functionality, such as residual terminal silylethoxy or methylsilylphenoxy groups obtained by the use of a tetraethoxysilane or methyltriphenoxysilane terminator, respectively.

The terminating agent is added to the reaction vessel, and the vessel is agitated for about 1 to about 1000 minutes. As a result, an elastomer is produced having an even greater affinity for silica compounding materials, and hence, even further reduced hysteresis. Additional examples of terminating agents include those found in U.S. Pat. No. 4,616,069 which is herein incorporated by reference. It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 150° C. to ensure complete reaction. Polymers terminated with a functional group as discussed hereinabove, are subsequently quenched with alcohol or other quenching agent as described hereinabove.

Lastly, the solvent is removed from the polymer by conventional techniques such as drum drying, extruder drying vacuum drying or the like, which may be combined with coagulation with water, alcohol or steam, thermal desolventization, or any other suitable method. If coagulation with water or steam is used, oven drying may be desirable.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/ propylene rubber and the like. When the functionalized polymers are blended with conventional rubbers, the amounts can vary widely within a range comprising about 5 to about 99 percent by weight of the total rubber, with the conventional rubber or rubbers making up the balance of the total rubber (100 parts). It is to be appreciated that the minimum amount will depend primarily upon the degree of reduced hysteresis that is desired.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts by weight per 100 parts of polymer (phr), preferably in an amount from about 5 to about 80 phr. The useful upper range is limited by the high viscosity imparted by fillers of this type. Some of the commercially available silicas which may be used include: Hi-Sil® 215, Hi-Sil® 233, and Hi-Sil® 190, produced by PPG Industries. Also, a number of useful commercial grades of different silicas are available from De Gussa Corporation, Rhone Poulenc, and J. M. Huber Corporation.

Although the vulcanizable elastomeric compounds of the present invention are primarily silica-filled, the polymers can be optionally compounded with all forms of carbon black in amounts ranging from 0 to about 50 parts by weight, per 100 parts of rubber (phr), with about 5 to about 40 phr being preferred. When carbon is present, with silica, the amount of silica can be decreased to as low as about one phr, otherwise it too is present alone in at least 5 phr. As is known to those skilled in the art, elastomeric compounds as are discussed herein are typically filled to a volume fraction of about 25 percent which is the total volume of filler(s) added divided by the total volume of the elastomeric stock. Accordingly, while the minimum amounts expressed herein are operable, a useful range of reinforcing fillers i.e., silica and carbon black, is about 30 to 100 phr.

The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks.

Other carbon blacks which may be utilized include acetylene blacks. Mixtures of two or more of the above blacks can be used in preparing the carbon black products of the invention. Typical values for surface areas of usable carbon blacks are summarized in TABLE I hereinbelow.

TABLE I

Carbon Blacks

| ASTM Designation (D-1 765-82a) | Surface Area (m$^2$/g) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized-in the preparation of the rubber compounds of the invention may be in pelletized form or an unpelletized flocculent mass. Preferably, for more uniform mixing, unpelletized carbon black is preferred.

Recognizing that carbon black may be used as an additional reinforcing filler with silica, the total amount of reinforcing filler(s) in the vulcanizable elastomeric compounds of the present invention ranges between about 30 to 100 phr, all of which can comprise silica or, mixtures with carbon black within the foregoing ranges. It is to be appreciated that as the amount of silica decreases, lower amounts of the processing aids of the present invention, plus silane, if any, can be employed.

When silica is employed as a reinforcing filler, it is customary to add bis[3-(triethoxysilyl)propyl]tetrasulfide to obtain good physical properties in a cured rubber stock containing silica as a filler. In general, the present invention provides a means to reduce or eliminate the level of this compound. This material is commonly added to silica filled rubber formulations and will be referred to throughout this specification by its industry recognized designation, Si69. In addition, the present invention further provides maintenance of the processability of the compounded stock, as measured by Mooney viscosity, at the same level as achieved with high levels of Si69. This replacement of Si69 results in reduced cost and provides a material that is stable for storage and is easily added to rubber compounds. In addition, the use of vulcanizable elastomeric compounds according to the present invention provides the same or better physical properties upon curing. Generally, the amount of Si69 that is added ranges between about 4 and 20 percent by weight, based upon the weight of silica filler present in the elastomeric compound. By practice of the present invention, it is possible to reduce the amount of Si69 down to about 5 percent, more preferably, 3 to 1 percent and most preferably, to eliminate its presence totally i.e., 0 percent. It may also be desirable to increase processability of the silica filled elastomer compounds without any decrease in the silane content which can be accomplished by the addition of a processing aid or filler according to the present invention as is described hereinafter.

Thus, in another embodiment, the present invention provides a silica-filled, vulcanizable elastomeric compound useful as tread stocks for pneumatic tires that employs a processing aid as a replacement for Si69, wherein the processing aid is selected from the group consisting of alkyl alkoxysilanes, fatty acid esters of hydrogenated and non-hydrogenated sugars, ethoxylated derivatives of fatty acid esters of hydrogenated and non-hydrogenated sugars, and mixtures thereof and wherein the processing aid is supported on the silica filler or other filler, e.g., either another reinforcing filler such as carbon black, or a non-reinforcing filler such as one of a number of mineral fillers or the like.

A mixture of a filler and a filler-supported processing aid selected from the group consisting of alkyl alkoxysilanes, fatty acid esters of hydrogenated and non-hydrogenated sugars, ethoxylated derivatives of fatty acid esters of hydrogenated and non-hydrogenated sugars, and mixtures thereof, is preferably added to the elastomer in an amount of about 5 to about 100 parts by weight per 100 parts of the elastomer. It should be stressed that when a silica-supported or carbon black-supported processing aid is used, the non-reinforcing fillers, including mineral fillers or other processing aids are not required in the elastomeric formulation. However, it will be appreciated that if mineral fillers are used, they may be used to support the processing aid(s).

Preferably, the processing aid is added to the silica or other filler in a mixture ratio of from about 1:99 to about 60:40, with a 50:50 mixture being most preferred.

The present invention utilizes the presence of one or more processing aids to replace the silane (Si69) to give equal processability of the vulcanizable compound, and better hot tear strength and lower hysteresis of the vulcanized rubber stock, without loss of the other measured physical properties. The processing aids are air stable and do not decompose. They are lower in cost and more storage stable than Si69, and when used with silica filled elastomers, give similar reduction of $ML_4$, and tan δ with an increase in tear strength.

In order to demonstrate the preparation and properties of silica-filled, diene elastomer containing rubber stocks prepared according to the present invention, styrene butadiene rubber (SBR) polymers were prepared and were compounded using the formulations set forth in Tables II and III below.

Test results for the Control, C-A, using the Si69 processing aid only, and Examples 1–3, using silane processing aids according to the invention in Formulation A, are reported in Table II.

TABLE II

Formulation A for the Partial Replacement of Si69 and Physical Test Results

| Material | Amount (phr) | | | |
|---|---|---|---|---|
| Example No. | C-A | 1 | 2 | 3 |
| SBR | 100 | 100 | 100 | 100 |
| Oil | 20 | 20 | 20 | 20 |
| Silica | 60 | 60 | 60 | 60 |
| Carbon Black | 6 | 6 | 6 | 6 |
| Stearic Acid | 2 | 2 | 2 | 2 |
| Wax | 0.75 | 0.75 | 0.75 | 0.75 |
| Si-69 | 5.4 | 0.6 | 0.6 | 0.6 |
| Silane (Type) | — | Octyl Trimeth- | Methacroyl Trimethoxy | Dimethyl Dimethoxy |

TABLE II-continued

Formulation A for the Partial Replacement of Si69 and Physical Test Results

| Material | Amount (phr) | | | |
|---|---|---|---|---|
| Example No. | C-A | 1 | 2 | 3 |
| Silane (Amount) | 0 | oxy 4.71 | 4.99 | 3.62 |
| Tackifier | 3.5 | 3.5 | 3.5 | 3.5 |
| Antioxidant | 0.95 | 0.95 | 0.95 | 0.95 |
| Sulfur | 1.4 | 1.4 | 1.4 | 1.4 |
| Accelerators | 2.4 | 2.4 | 2.4 | 2.4 |
| Zinc Oxide | 3 | 3 | 3 | 3 |
| Physical Properties | | | | |
| $ML_{1+4}$ @ 100° C. | 93.7 | 84.7 | 93.3 | 88.8 |
| Tensile(psi) @ 23° C. | 2913 | 2216 | 2476 | 2834 |
| Tensile(psi) @ 100° C | 1239 | 954 | 1122 | 1294 |
| % Elong. at break, 23° C. | 444 | 603 | 504 | 551 |
| % Elong. at break, 100 ° C. | 262 | 407 | 342 | 365 |
| Ring Tear (lb/in) @ 100° C. | 191 | 198 | 179 | 223 |
| Dispersion Index, % | 72.9 | 76.1 | 84 | 84.3 |

Test results for the Control, C-B, using the Si69 processing aid only, and Examples 4–7, using silane processing aids according to the invention in Formulation B, are reported in Table III.

TABLE III

Formulation B for the Partial Replacement of Si69 and Physical Test Results

| Material | Amount (phr) | | | | |
|---|---|---|---|---|---|
| Example No. | C-B | 4 | 5 | 6 | 7 |
| SBR | 75 | 75 | 75 | 75 | 75 |
| BR | 25 | 25 | 25 | 25 | 25 |
| Oil | 41.25 | 41.25 | 41.25 | 41.25 | 41.25 |
| Silica | 80 | 80 | 80 | 80 | 80 |
| Carbon Black | 8 | 8 | 8 | 8 | 8 |
| Stearic Acid | 1 | 1 | 1 | 1 | 1 |
| Wax | 1.5 | 1.5 | 1.5 | 1.5 | 1.5 |
| Si-69 | 7.2 | 0.8 | 0.8 | 0.8 | 0.8 |

TABLE III-continued

Formulation B for the Partial Replacement of Si69 and Physical Test Results

| Material | Amount (phr) | | | | |
|---|---|---|---|---|---|
| Example No. | C-B | 4 | 5 | 6 | 7 |
| Silane (Type) | — | Propyl Tri-ethoxy | 3-Chloropropyl Triethoxy | Octyl Triethoxy | i-Butyl Tri-ethoxy |
| Silane (Amount) | 0 | 5.5 | 6.42 | 7.39 | 5.88 |
| Tackifier | 3 | 3 | 3 | 3 | 3 |
| Antioxidant | 1.17 | 1.17 | 1.17 | 1.17 | 1.17 |
| Sulfur | 2.8 | 2.8 | 2.8 | 2.8 | 2.8 |
| Accelerators | 2.4 | 2.4 | 2.4 | 2.4 | 2.4 |
| Zinc Oxide | 1.7 | 1.7 | 1.7 | 1.7 | 1.7 |
| Physical Properties | | | | | |
| $ML_{1+4}$ @ 100° C. | 64.8 | 69.2 | 96.1 | 53.8 | 93.9 |
| Tensile(psi) @ 23° C. | 2497 | 2268 | 2566 | 2400 | 2513 |
| Tensile(psi) @ 100° C. | 1453 | 1278 | 1693 | 1280 | 1379 |
| % Elong. at break, 23° C. | 487 | 614 | 544 | 612 | 649 |
| % Elong. at break, 100° C. | 386 | 486 | 487 | 467 | 499 |
| Ring Tear (lb/in) @ 100° C. | 190 | 270 | 245 | 262 | 298 |
| Dispersion Index, % | 93.1 | 80.5 | 95.7 | 87.9 | 93.3 |

A series of tests were conducted, in which the Si69 processing aid was omitted and insoluble sulfur was added, while processing Formulation B with 2 phr octyl-triethoxy silane, and 4 phr sorbitan oleate. Test conditions and results are reported for Examples 8–17 and the Control (no added insoluble sulfur), C-C, in Table IV, below. As illustrated in Table IV, the degree of cure of the composition, expressed as the 300% Modulus (psi) and/or the molecular weight between crosslinks $M_c$, g/mol), improved as the amount of additional sulfur (and total sulfur) increased until the 300% Modulus and/or the $M_c$ were approximately equal to that of the satisfactorily cured control (C-C) composition containing Si69 and no added sulfur. Both the 300% Modulus and the $M_c$ are well known in the art to be indicators of the state of cure of a vulcanize elastomeric composition.

TABLE IV

Physical Properties of Formulation B with 2 phr Octyl-Triethoxy Silane, 4 phr Sorbitan Monooleate, and Insoluble Sulfur without Si69

| Sample | 8 | 9 | 10 | 11 | 12 | 13 | 14 | 15 | 16 | 17 | C-C |
|---|---|---|---|---|---|---|---|---|---|---|---|
| Insoluble S (phr) | 1.4 | 1.7 | 2 | 2.3 | 2.6 | 2.9 | 3.3 | 3.7 | 4.1 | 4.5 | 0 |
| Total S (phr) | 2.8 | 3.1 | 3.4 | 3.7 | 4 | 4.3 | 4.7 | 5.1 | 5.5 | 5.9 | 1.4 |
| Physical Test Results | | | | | | | | | | | |
| $ML_{1+4}$/100° C. | 84 | 81.9 | 80.7 | 78.9 | 78.9 | 103.6 | 101.8 | 99.5 | 99.8 | 101.7 | 75.7 |
| Monsanto Cure @ 171° C. | | | | | | | | | | | |
| ML | 13.6 | 14.7 | 13.4 | 13 | 12.8 | 18 | 18.2 | 18 | 17.8 | 18.2 | 11.6 |
| MH | 33.4 | 34.8 | 37.1 | 37 | 38.3 | 46.5 | 48.3 | 50.6 | 50.8 | 53.9 | 37.37 |
| ts2 | 2:54 | 2:48 | 2:41 | 2:47 | 2:44 | 2:42 | 2:34 | 2:30 | 2:28 | 2:29 | 2:30 |
| tc90 | 10:51 | 9:50 | 9:42 | 9:28 | 9:15 | 12:05 | 11:36 | 11:11 | 10:29 | 11:11 | 10:01 |
| Ring Tensile @ 24° C. | | | | | | | | | | | |
| 100% Modulus, psi | 188 | 184 | 209 | 194 | 227 | 212 | 267 | 256 | 284 | 326 | 318 |
| 300% Modulus, psi | 494 | 485 | 592 | 556 | 667 | 670 | 792 | 765 | 872 | 988 | 1150 |
| Tensile str, psi | 1798 | 1550 | 1814 | 1548 | 1769 | 1842 | 2120 | 1757 | 1925 | 2076 | 2809 |
| % Elongation | 724 | 657 | 641 | 613 | 594 | 601 | 591 | 538 | 527 | 510 | 556 |
| Break energy, lbs/in² | 5273 | 4203 | 4835 | 4000 | 4445 | 4569 | 5196 | 4034 | 4343 | 4580 | 6596 |

TABLE IV-continued

Physical Properties of Formulation B with 2 phr Octyl-Triethoxy Silane, 4 phr Sorbitan Monooleate, and Insoluble Sulfur without Si69

| Sample | 8 | 9 | 10 | 11 | 12 | 13 | 14 | 15 | 16 | 17 | C-C |
|---|---|---|---|---|---|---|---|---|---|---|---|
| Ring Tensile @ 100° C. | | | | | | | | | | | |
| 100% Modulus, psi | 131 | 151 | 191 | 215 | 187 | 210 | 231 | 255 | 286 | 292 | 268 |
| 300% Modulus, psi | 333 | 381 | 519 | 566 | 532 | 621 | 656 | 730 | 846 | 833 | 661 |
| Tensile str, psi | 905 | 1062 | 1233 | 1162 | 983 | 1156 | 1017 | 878 | 1079 | 1042 | 1263 |
| % Elongation | 649 | 652 | 592 | 529 | 500 | 500 | 441 | 340 | 375 | 364 | 364 |
| Break Energy, lbs/in$^2$ | 2612 | 3070 | 3306 | 2850 | 2310 | 2849 | 2172 | 1565 | 1984 | 1906 | 2092 |
| Ring Tear @ 171° C., ppi | 250 | 217 | 228 | 230 | 201 | 247 | 216 | 201 | 192 | 221 | 276 |
| Pendulum Rebound 65° C. | 33.6 | 35 | 32.4 | 37.6 | 40.2 | 37.2 | 40.2 | 37.6 | 41.2 | 41.4 | 53.6 |
| Wet Stanley London,(#/std) | 56/53 | 54/53 | 56/53 | 53/53 | 57/53 | 60/54 | 62/54 | 63/54 | 64/54 | 63/54 | |
| Shore A @ 24° C. | 68 | 67 | 68 | 68 | 69 | 71 | 71 | 73 | 73 | 72 | 65 |
| Dispersion Index #1 | 85.6 | 85.5 | 86.5 | 87.1 | 88 | | | | | | 59.4 |
| Specific Gravity | 1.184 | 1.186 | 1.189 | 1.188 | 1.189 | 1.195 | 1.197 | 1.199 | 1.199 | 1.21 | 1.202 |
| Rheometries @ 7% strain | | | | | | | | | | | |
| tan δ @ 65° C. | .1978 | .1924 | .1807 | .1858 | .1789 | .1697 | .1662 | .158 | .1583 | .1503 | .1839 |
| ΔG' @ 65° C., MPa | 4.884 | 6.201 | 6.133 | 5.937 | 6.117 | 7.747 | 8.845 | 9.295 | 9.552 | 10.041 | 6.88 |
| Tensile Retraction | | | | | | | | | | | |
| Mc × 10$^{-3}$ g/mol | 20.9 | 20.0 | 17.5 | 17.4 | 16.3 | 15.4 | | 13.2 | | 12.3 | 12.2 |

A further series of tests were conducted, in which Formulation B, described in Table III, was processed with added sulfur and a processing aid comprising 1.5 phr octyl-triethoxy silane, 0.5 phr Si69, and 4 phr sorbitan oleate. Test conditions and results are reported for Examples 18–22 in Table V, below. Table V illustrates a progressive improvement in the degree of cure of the composition, expressed as the 300% Modulus (psi) and/or the molecular weight between crosslinks ($M_c$, g/mol), as the total amount of added sulfur is progressively increased.

TABLE V

Physical Properties of Formulation B with 1.5 phr Octyl-triethoxysilane, 4 phr Sorbitan, 0.5 Si69 and Insoluble Sulfur

| Sample | 18 | 19 | 20 | 21 | 22 |
|---|---|---|---|---|---|
| Insoluble S (phr) | 2.8 | 3.2 | 3.6 | 4 | 4.4 |
| Total S (phr) | 4.2 | 4.6 | 5 | 5.4 | 5.8 |
| Physical Test Results | | | | | |
| ML$_{1+4}$/100° C. | 81.9 | 83.6 | 84.2 | 86.3 | 80.8 |
| Monsanto Cure @ 171° C. | | | | | |
| ML | 13.15 | 13.2 | 13.15 | 13.82 | 12.48 |
| MH | 41.84 | 44.62 | 44.62 | 46.58 | 46.98 |
| ts2 | 2:50 | 2:44 | 2:43 | 2:35 | 2:38 |
| tc90 | 10:15 | 10:12 | 9:12 | 9:24 | 8:59 |
| Ring Tensile @ 24° C. | | | | | |
| 100% Modulus, psi | 273 | 291 | 326 | 341 | 408 |
| 300% Modulus, psi | 935 | 994 | 1112 | 1158 | 1452 |
| Tensile str, psi | 2323 | 2183 | 2112 | 2012 | 2497 |
| % Elongation | 582 | 537 | 483 | 461 | 460 |
| Break Energy, lbs/in$^2$ | 5760 | 5099 | 4545 | 4164 | 5130 |
| Ring Tensile @ 100° C. | | | | | |
| 100% Modulus, psi | 251 | 251 | 287 | 307 | 311 |
| 300% Modulus, psi | 826 | 798 | 933 | 1030 | 998 |
| Tensile str, psi | 1326 | 1215 | 1255 | 1229 | 1113 |
| % Elongation | 444 | 428 | 388 | 350 | 329 |
| Break Energy, lbs/in$^2$ | 2720 | 2439 | 2306 | 2069 | 1800 |
| Ring Tear @ 171° C., psi | 240 | 230 | 201 | 219 | 206 |
| Pendulum Rebound 65° C. | 37.2 | 39 | 42.8 | 39.4 | 42.4 |
| Wet Stanley London (#/std) | 64/53 | 61/53 | 64/53 | 65/53 | 65/53 |
| Shore A, @ RT | 72 | 71 | 72 | 74 | 73 |
| Specific Gravity | 1.195 | 1.196 | 1.197 | 1.197 | 1.202 |
| Rheometries @ 7% strain | | | | | |
| tan δ @ 65° C. | 0.1577 | 0.1528 | 0.1444 | 0.1384 | 0.1533 |
| Δ G' @ 65° C., MPa | 6.89 | 6.798 | 6.676 | 6.285 | 7.789 |

TABLE V-continued

Physical Properties of Formulation B with 1.5 phr Octyl-triethoxysilane,
4 phr Sorbitan, 0.5 Si69 and Insoluble Sulfur

| Sample | 18 | 19 | 20 | 21 | 22 |
|---|---|---|---|---|---|
| Tensile Retraction Mc, × $10^{-3}$ g/mol | 12.6 | 12.4 | 11.1 | 10.4 | 9.7 |

The present invention can thus further utilize the presence of an ester of a fatty acid or an ester of a polyol as a processing aid to replace the silane Si69 to give equal processability of the vulcanizable compound, and better hot tear strength and lower hysteresis of the vulcanized rubber stock, without loss of the other measured physical properties.

The further processing aid, such as the preferred sorbitan oleate, is air stable and does not decompose. The sorbitan oleate is lower in cost and more storage stable than Si69, and when used with a silica filler and a silane terminated polymer, gives similar reduction of $ML_4$, and tan δ with an increase in tear strength.

The additional processing aids useful according to the present invention include esters of fatty acids or esters of polyols. Representative examples include the sorbitan oleates, such as sorbitan monooleate, dioleate, trioleate and sesquioleate, as well as sorbitan esters of laurate, palmitate and stearate fatty acids, and the polyoxyethylene derivatives of each, and other polyols, including glycols such as polyhydroxy compounds and the like. Of these, sorbitan monooleate is preferred.

In yet another embodiment of the present invention, fatty acid esters of hydrogenated and non-hydrogenated $C_5$ and $C_6$ sugars e.g., sorbitose, mannitose and arabinose, can be used as the processing aid in replacement of Si69. These compounds have at least three hydroxyl groups and from one to 3.5 ester groups (sesqui esters). Also useful are the polyoxyethylene derivatives thereof. The esterified hydrogenated and non-hydrogenated sugars can be described generally by the following formula using sorbitol as the representative ester

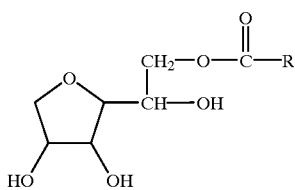

where R is derived from $C_{10}$ to $C_{22}$ saturated and unsaturated fatty acids, for example, stearic, lauric, palmitic, oleic and the like.

Representative examples include the sorbitan oleates, including monooleate, dioleate, trioleate and sesquioleate, as well as sorbitan esters of laurate, palmitate and stearate fatty acids, and polyoxyethylene derivatives thereof, and other polyols and, more particularly, glycols, such as polyhydroxy compounds, and the like. Of these, sorbitan oleates are preferred, with sorbitan monooleate being most preferred. In similar fashion, other esters can be formed with mannitose and arabinose. Generally, the amount of this processing aid that is employed ranges from 0 to about 20 parts by weight, phr, with from about one to about 10 phr being preferred.

These processing aids are commercially available from ICI Specialty Chemicals under the tradename SPAN, which is a registered trademark of ICI. Several useful products include SPAN 60 (sorbitan stearate); SPAN 80 (sorbitan oleate) and SPAN 85 (sorbitan tri-oleate). Other commercially available sorbitans can be used for example, the sorbitan monooleates known as Alkamuls SMO; Capmul O; Glycomul O; Arlacel 80; Emsorb 2500 and, S-Maz 80. Similar products of other esters are likewise available.

The polyoxyethylene derivatives of the foregoing processing aids according to the present invention also include fatty acid esters of hydrogenated and non-hydrogenated $C_5$ and $C_6$ sugars e.g., sorbitose, mannitose and arabinose, and have at least three hydroxyl groups and from one to 3.5 ester groups (sesqui esters). The polyoxyethylene derived esterified hydrogenated and non-hydrogenated sugars can be described generally by the following formula again, using sorbitol as the representative ester:

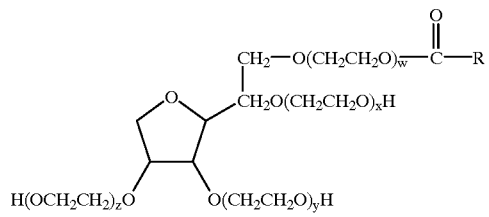

where R is derived from $C_{10}$ to $C_{22}$ saturated and unsaturated fatty acids, for example, stearic, lauric, palmitic, oleic and the like and the sum of w+x+y+z equals 20.

The Polyoxyethylene derivatives of these processing aids, sometimes referred to as polysorbates and polyoxyethylene sorbitan esters, are analogous to the fatty acid esters of hydrogenated and non-hydrogenated sugars noted above (sorbitans) except that ethylene oxide units are placed on each of the hydroxyl groups. Representative examples of the polysorbates include POE (20) sorbitan monooleate; Polysorbate 80; Tween 80; Emsorb 6900; Liposorb O-20; T-Maz 80 and the like. The TWEENS are commercially available from ICI Specialty Chemicals, the tradename TWEEN being a registered trademark of ICI. Several useful products include TWEEN 60 [POE (20) sorbitan stearate]; TWEEN 80 [POE (20) sorbitan oleate]; TWEEN 85 [POE (20) sorbitan tri-oleate]; POE (20) sorbitan sesquioleate; POE (20) sorbitan laurate; POE (20) sorbitan palmitate as well as TWEEN 20, TWEEN 21, TWEEN 60K, TWEEN 65, TWEEN 65K and TWEEN 81. Generally, the amount of this processing aid that is employed ranges from 0 to about 20 parts by weight, phr, with from about one to about 10 phr being preferred.

Finally, certain additional fillers can be utilized according to the present invention as processing aids which include, but are not limited to, mineral fillers, such as clay (hydrous aluminum silicate), talc (hydrous magnesium silicate), and mica as well as non-mineral fillers such as urea and sodium sulfate. Preferred micas contain principally alumina, silica and potash, although other variants are also useful, as set forth below. The additional fillers are also optional and can be utilized in the amount of from 0 parts to about 40 parts per 100 parts of polymer (phr), preferably in an amount from about 1 to about 20 phr. It will be understood that these mineral fillers can also be used as non-reinforcing fillers to support the processing aids of the present invention.

The selection of processing aid(s) and relative amounts for practice of the present invention includes the use of any one of the foregoing materials, as well as mixtures thereof, as noted hereinabove. Accordingly, various embodiments are possible as follows.

a) The use of fatty acid esters of hydrogenated and non-hydrogenated sugars alone, in amounts of up to 20 phr. These esters include all of the esterified sugars, but not sorbitan monooleate.

b) The use of polyoxyethylene derivatives of the fatty acid esters of hydrogenated and non-hydrogenated sugars alone, in amounts of up to 20 phr.

c) The use of a mineral or non-mineral filler alone or mixtures thereof, in amounts of up to 40 phr. It is to be understood that reference to these mineral and non-mineral fillers does not include the reinforcing fillers disclosed herein—carbon black and silica.

d) Mixtures of fatty acid esters of hydrogenated and non-hydrogenated sugars with the polyoxyethylene derivatives thereof, in an amount of up to 20 total phr, with a minimum of at least about one phr of either processing aid. When such mixtures are utilized, sorbitan monooleate can be employed.

e) Mixtures of fatty acid esters of hydrogenated and non-hydrogenated sugars with a mineral or non-mineral filler, as above, in an amount of up to 30 total phr, with a minimum of at least about one phr of the processing aid. When such mixtures are utilized, sorbitan monooleate can be employed.

f) Mixtures of polyoxyethylene derivatives of the fatty acid esters of hydrogenated and non-hydrogenated sugars with a mineral or non-mineral filler, as above, in an amount of up to 30 total phr, with a minimum of at least about one phr of the processing aid. When such mixtures are utilized, sorbitan monooleate can be employed.

g) Mixtures of fatty acid esters of hydrogenated and non-hydrogenated sugars with the polyoxyethylene derivatives thereof and with a mineral or non-mineral filler, as above, in an amount of up to 30 total phr, with a minimum of at least about one phr of either processing aid. When such mixtures are utilized, sorbitan monooleate can be employed.

While practice of the present invention includes the addition of at least one type of processing aid or an additional filler or combinations thereof, to be effective, preferably at least one part by weight of each type that is selected should be employed. Where only a processing aid or mixtures thereof are added, the upper limit is about 20 phr as contrasted with the use of an additional filler at an upper limit of about 40 phr. When a processing aid(s) is present with an additional filler, the upper limit total of these additives is about 30 phr. Irrespective of the upper limit amounts stated herein, it is to be appreciated that the combined total filler, that is, reinforcing fillers (silica and carbon black) plus additional fillers (other than silica and carbon black) will generally not exceed about 25 percent volume fraction. Accordingly, for an elastomeric stock containing additional fillers at the upper range of about 40 phr, the amount of reinforcing fillers will be lower than where additional fillers have not been added. Unexpectedly, we have found herein that physical properties do not fall off where additional filler or fillers are added and the amount of reinforcing fillers are lowered.

The reinforced rubber compounds can be cured in a conventional manner with known vulcanizing agents at about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

Vulcanizable elastomeric compositions of the invention can be prepared by compounding or mixing the elastomeric polymer with silica, optionally carbon black, as noted above, and one or more of the processing aids and optionally additional filler(s) according to the present invention, as well as other conventional rubber additives including for example, plasticizers, antioxidants, curing agents and the like, using standard rubber mixing equipment and procedures.

The present invention was demonstrated by comparing tread formulations as shown in TABLE VI in which 3 parts per hundred rubber (phr) Si69 (control, C-F) were replaced with 7.5 phr of either an aromatic oil (C-D) or naphthenic oil (C-E). This replacement was further compared to a stock prepared according to the present invention with 3 phr of sorbitan monooleate and 4.5 phr aromatic oil (Sample 23).

TABLE VI

Rubber Formulations to Evaluate Silica Modification and Physical Properties Obtained

| Materials | Amount (parts per hundred rubber) | | | |
| --- | --- | --- | --- | --- |
| Sample | C-D | C-E | C-F | 23 |
| SBR | 75 | 75 | 75 | 75 |
| Natural Rubber | 25 | 25 | 25 | 25 |
| Silica | 30 | 30 | 30 | 30 |
| Carbon Black | 35 | 35 | 35 | 35 |
| Wax | 1 | 1 | 1 | 1 |
| Stearic Acid | 1.5 | 1.5 | 1.5 | 1.5 |
| Zinc Oxide | 3 | 3 | 3 | 3 |
| Accelerators | 2 | 2 | 2 | 2 |
| Antioxidant | 0.95 | 0.95 | 0.95 | 0.95 |
| Retarder | 0.25 | 0.25 | 0.25 | 0.25 |
| Varied Materials | | | | |
| Si69 Processing Aid | 0 | 0 | 3 | 0 |
| Sulfur | 2.7 | 2.7 | 1.7 | 2.7 |
| Aromatic Oil | 7.5 | 0 | 0 | 4.5 |
| Naphthenic Oil | 15 | 22.5 | 15 | 15 |
| Sorbitan Oleate | 0 | 0 | 0 | 3 |
| $ML_4$ @ 130° C. | 72 | 74 | 59 | 59 |
| M50 @ 25° C. (psi) | 271 | 295 | 236 | 241 |
| M300 @ 25° C. (psi) | 1750 | 1990 | 1970 | 1670 |
| Tensile @ 25° C. (psi) | 2380 | 2520 | 2410 | 2570 |

TABLE VI-continued

Rubber Formulations to Evaluate Silica Modification and Physical Properties Obtained

| Materials | Amount (parts per hundred rubber) | | | |
|---|---|---|---|---|
| Sample | C-D | C-E | C-F | 23 |
| % Elongation @ 25° C. | 383 | 361 | 349 | 419 |
| M200 @ 100° C. (psi) | 817 | 959 | 921 | 860 |
| Tensile @ 100° C. (psi) | 1270 | 1410 | 1300 | 1400 |
| % Elongation @ 100° C. | 280 | 266 | 256 | 290 |
| Tear Strength @ 171° C. (lb/in) | 98 | 95 | 99 | 120 |
| Tan δ 50° C. | 0.123 | 0.105 | 0.132 | 0.105 |

As can be seen in TABLE VI, Sample 23 had better tear strength. The $ML_4$ @ 130° C. of Sample 23 has been reduced to the level of the control, C-F, and the 50° C. tan δ is lower than the. Samples C-F or C-D and similar to that of Sample C-E.

A Mooney viscosity reduction of the vulcanizable compound by the sorbitan monooleate (Sor. Oleate) in a high silica containing formulation was also demonstrated with the addition of other $ML_4$ reducing co-agents, summarized in TABLE VII hereinbelow.

TABLE VII

Rubber Formulations to Evaluate Mooney Reduction and Test Results Thereof

| Material | Amount (parts per hundred rubber) |
|---|---|
| SBR | 75 |
| PBD | 25 |
| Silica | 80 |
| Carbon Black | 8 |
| Modifier | Variable (see below) |
| Stearic Acid | 1 |
| Naphthenic Oil | 41.25 |
| Wax | 1.5 |
| Resins | 1.5 |
| Stabilizers | 1.17 |
| Zinc Oxide | 1.7 |
| Curatives | 2.4 |
| Sulfur | 2 |

Modifier Added (in phr) and $ML_4$/100° C.

| Sample | Si69 (phr) | Modifier 1 | phr | Modifier 2 | phr | $ML_4$/100° C. |
|---|---|---|---|---|---|---|
| C-G | 0 | None | 0 | None | 0 | 161 |
| C-H | 8 | None | 0 | None | 0 | 84 |
| 24 | 0.8 | Sor. Oleate | 4 | None | 0 | 129 |
| 25 | 0.8 | Sor. Oleate | 8 | None | 0 | 104 |
| C-I | 0.8 | PEG | 4 | None | 0 | 148 |
| C-J | 0.8 | PEG | 8 | None | 0 | 124 |
| C-K | 0.8 | Sorbitol | 4 | None | 0 | 146 |
| C-L | 0.8 | Sorbitol | 8 | None | 0 | 136 |
| 26 | 0 | Sor. Oleate | 4 | OTES | 3 | 73 |
| 27 | 0 | Sor. Oleate | 4 | OTES | 2 | 79 |
| 28 | 0 | Sor. Oleate | 4 | OTES/Talc | 3/2 | 72 |
| 29 | 0 | Sor. Oleate | 4 | OTES/Urea | 3/2 | 70 |
| C-M | 0.8 | None | 0 | Mica | 15 | 122 |
| 30 | 0.8 | Sor. Oleate | 4 | Mica | 15 | 93 |
| 31 | 0.8 | Sor. Oleate | 8 | Mica | 15 | 77 |

Cured at 171° C. for 20 minutes
OTES = Octyltriethoxysilane

As is demonstrated in TABLE VII, the sorbitan oleate processing aid was more effective in reducing $ML_4$ at 100° C. than PEG or sorbitol (Samples C-I to C-L). The addition of a small amount of another silane such as Si69 or OTES gave an even greater $ML_4$ reduction (Samples 24–27). Co-agents like urea, talc and mica also had a large effect on $ML_4$ reduction, especially when used with the sorbitan oleate (Samples 28–31). In fact, there is an effect on $ML_4$ reduction even when a low level of silane is used along with the sorbitan oleate and mica (compare Samples 30–31 with Sample C-M). These results clearly demonstrate the advantage of using a processing aid such as sorbitan oleate to reduce $ML_4$ in silica filled rubber stocks.

We have therefore found that mineral fillers inhibit re-agglomeration of the silica in silica-filled vulcanizable elastomer formulations and maintain the dispersion of the silica, thereby reducing the mixing required and aiding in the processability of the compound through a diminished Mooney viscosity. This is demonstrated by the compounding of the following formulation to screen silica filled, vulcanizable elastomeric compound properties described below in TABLE VIII.

TABLE VIII

Screening Formulation

| Material | Silica | Carbon Black |
|---|---|---|
| Polymer | 100 | 100 |
| Silica | 40 | |
| Carbon Black | 8 | 45 |
| Si-69 | 1 | |
| Dicyclohexylamine | 1 | 1 |
| Antioxidant | 1 | 1 |
| Stearic Acid | 2 | 2 |
| Sulfur | 1.4 | 1.4 |
| Accelerators | 2.4 | 2.4 |
| Zinc Oxide | 3 | 3 |
| Totals | 159.8 | 155.8 |

In this basic formulation, without oil, five parts (by weight) of the silica were replaced with five parts of either mica, talc, or clay and compounded with a rubber specifically terminated to interact with filler through residual terminal methylsilylphenoxy groups. The rubber had been terminated with methyltriphenoxysilane ($MeSi(OPh)_3$). Both a silica and carbon black filled stock were used as controls in these examples, as set forth in TABLE IX.

TABLE IX

Partial Silica Replacement with Mineral Fillers

| Sample | C-K | 32 | 33 | 34 | C-O |
|---|---|---|---|---|---|
| Additive | | Talc | Mica | Clay | Carbon Black |
| Silica | 40 | 35 | 35 | 35 | |
| Carbon Black | 8 | 8 | 8 | 8 | 45 |
| Talc | | 5 | | | |
| Mica | | | 5 | | |
| Clay | | | | 5 | |

The properties of the compounds and the cured stocks are presented in TABLE IX. The uncured compound $ML_{1+4}$ at 100° C. of the stocks containing talc and mica were significantly lower than the all silica control. Moreover, the minimum torques (ML) by Monsanto Rheometer were also lower, indicative of a more processable stock. The hardness and MH of the talc and mica stocks indicated a slightly lower state of cure, although only slight differences were shown in the tensile properties, as reported in Table X, below.

TABLE X

Physical Test Results
Initial Partial Silica Replacement with Mineral Fillers

| Sample | C-N | 32 | 33 | 34 | C-O |
|---|---|---|---|---|---|
| Cpd $ML_{1+4}$ 100° C. | 107.8 | 96.7 | 97.5 | 102.7 | 88.1 |
| Monsanto Rheometer | | | | | |
| ML | 9.55 | 8.06 | 8.40 | 8.78 | 6.53 |
| $TS_2$ | 3'37" | 3'42" | 3'46" | 3'39" | 1'32" |
| $TC_{90}$ | 12'39" | 10'24" | 10'31" | 10'42" | 3'17" |
| MH | 43.39 | 41.27 | 41.47 | 42.38 | 34.60 |
| Shore A | 69 | 65 | 66 | 67 | 67 |
| Pendulum Rebound 65° C. | 69.8 | 71.2 | 71.8 | 71.2 | 63.6 |
| Ring Tensile 24° C. | | | | | |
| 100% Mod. | 598 | 589 | 550 | 558 | 569 |
| Max. Stress (psi) | 2177 | 2186 | 2090 | 1885 | 2636 |
| Max. Strain (%) | 298 | 309 | 302 | 289 | 311 |
| Ring Tensile 100° C. | | | | | |
| 100% Mod. | 473 | 471 | 443 | 494 | 370 |
| Max. Stress (psi) | 1002 | 933 | 918 | 948 | 1712 |
| Max. Strain (%) | 190 | 184 | 188 | 182 | 272 |
| Ring Tear 171° C. lb/in | 82 | 68 | 65 | 62 | 95 |
| 65° C. | | | | | |
| Tan δ (@ 7% Elongation) | 0.070 | 0.063 | 0.064 | 0.074 | 0.121 |
| G', MPa | 3.131 | 3.004 | 3.041 | 3.163 | 2.752 |
| ΔG', MPa | 0.586 | 0.349 | 0.534 | 0.655 | 0.811 |
| Wet Skid | 45 | 47 | 44 | 43 | 37 |

Further testing of silica-filled vulcanizable elastomeric compounds was conducted to determine the effect of additional mineral fillers and the use of sorbitan oleate as a processing aid in the stock formulations. These examples are described in TABLES XI, XII, XIV and XVI, and results of the tests reported in TABLES XIII, XV, XVII and XVIII.

Compound properties displayed in TABLE XII indicated a lower raw compound $ML_{1+4}$ at 100° C. with lower T80, and lower minimum torque, ML indicative of an easier processing stock. Tensile properties of the cured stocks were not adversely affected by the mica or talc at these levels and neither was the hardness or state of cure. Further, hot ring tear was improved compared to the control. Rebound and Tan δ were indicative of lower rolling resistance stocks.

TABLE XI

Basic Formulation (C-M)

| | Parts |
|---|---|
| Masterbatch Material | |
| SBR | 90.75 |
| BR | 25 |
| Silica | 80 |
| Mica | Variable |
| Talc | Variable |
| Sorbitan Monooleate | Variable |
| Si69, Neat | Variable |
| Carbon Black | 8 |
| Oil | 25.5 |
| Stearic Acid | 1 |
| Wax Blend | 1.5 |
| Resin | 3 |
| Final Mixing Material | |
| Masterbatch | (as above) |
| Processing Aid | 0.95 |
| Antiozonant | 0.22 |
| Zinc Oxide | 1.7 |
| Resin | 2.5 |
| Accelerators | 2.4 |
| Sulfur | Variable |

TABLE XII

Partial Silica Replacement with Talc or Mica

| Sample | C-P | 35 | 36 | 37 | 38 | 39 |
|---|---|---|---|---|---|---|
| Silica (phr) | 80 | 78.5 | 76.4 | 72.7 | 76.6 | 73.3 |
| Talc (phr) | 0 | 2 | 5 | 10 | 0 | 0 |
| Mica (phr) | 0 | 0 | 0 | 0 | 5 | 10 |
| Accelerator (phr) | 2.4 | 2.4 | 2.4 | 2.4 | 2.4 | 2.4 |
| Sulfur (phr) | 1.6 | 1.6 | 1.6 | 1.6 | 1.6 | 1.6 |
| Si69 (phr) | 8 | 8 | 8 | 8 | 8 | 8 |

TABLE XIII

Physical Test Results
Partial Replacement of Silica with Talc or Mica

| Sample | C-P | 35 | 36 | 37 | 38 | 39 |
|---|---|---|---|---|---|---|
| Mooney Viscometer | | | | | | |
| $ML_{1+4}$(100° C.) | 82.0 | 80.3 | 77.9 | 71.0 | 76.7 | 71.7 |
| $T_{80}$ (seconds) | 44.3 | 42.9 | 34.7 | 24.5 | 33.7 | 26.5 |
| Monsanto Cure (170° C.) | | | | | | |
| ML | 12.14 | 12.04 | 11.46 | 10.37 | 11.41 | 10.47 |
| $TS_2$ | 2'31" | 2'30" | 2'29" | 2'32" | 2'37" | 2'30" |
| $TC_{90}$ | 13'52" | 13'08" | 12'11" | 11'37" | 12'22" | 11'56" |
| MH | 35.38 | 35.95 | 35.69 | 33.97 | 35.48 | 34.60 |
| Ring Tensile @ 23° C. | | | | | | |
| 100% Modulus | 281 | 294 | 335 | 323 | 319 | 315 |
| Max. Stress (psi) | 2434 | 2449 | 2601 | 2709 | 2634 | 2510 |
| Max. % Strain | 436 | 430 | 425 | 417 | 436 | 413 |
| Ring Tensile @ 100% | | | | | | |
| 100% Modulus | 314 | 258 | 283 | 253 | 274 | 305 |
| Max. Stress (psi) | 1580 | 1405 | 1447 | 1264 | 1471 | 1485 |
| Max. % Strain | 436 | 430 | 425 | 417 | 436 | 413 |
| Ring Tear Strength @ 170° C. (lb/in) | 189 | 239 | 238 | 215 | 256 | 227 |
| Pendulum Rebound 65° C. | 50.6 | 51.6 | 52.2 | 54.4 | 52.6 | 53.2 |
| Shore "A" Hardness | 66.0 | 70.0 | 69.0 | 65.0 | 65.0 | 67.0 |
| Rheometrics @ 65° C. | | | | | | |
| Tan δ @ 7% Strain | 0.1871 | 0.1825 | 0.1866 | 0.1730 | 0.1694 | 0.1740 |
| ΔG', MPa | 6.201 | 7.237 | 6.825 | 4.949 | 6.033 | 5.498 |

TABLE XIV lists variations in order to maintain a constant volume fraction filler in the basic formulation, provided in TABLE XI. Among these variations were included two types of mica to replace some silica and replacement of Si69 with sorbitan monooleate and silica with a non reinforcing carbon black, N880. The mica utilized contained 16% Mg and is considered to be the mineral biotite, whereas C-3000 (available from KMG Minerals Inc, Kings Mountain, N.C.) is muscovite and contains very little magnesium. Properties for these formulations are displayed in TABLE XV.

A least squares estimate of the $ML_{1+4}$ at 100° C. and 0.8 parts Si69 was 137 in the all silica formulation. Addition of up to 15 parts mica caused a significant decrease in the observed value which was enhanced by the addition of sorbitan monooleate. There was an unexpected synergism of these additives on reduction of $ML_{1+4}$, t80, and ML. MH, tensile, and hardness, all indicative of a lower state of cure, were reduced by the sorbitan monooleate. These effects were also reflected in the tensile retraction data as well.

Adjustment of curatives compensated for the lower cure rate. Even at the lower state of cure, these stocks had lower Tan δ values indicative of lower rolling resistance and increased fuel efficiency. This was further enhanced with a tighter cure.

TABLE XIV

Partial Silica Replacement with Mica

| Sample | C-Q | C-R | C-S | C-T | C-U | C-V | 40 | 41 | 42 | 43 | 44 | 45 | C-W | C-X | 46 |
|---|---|---|---|---|---|---|---|---|---|---|---|---|---|---|---|
| Silica (phr) | 80 | 80 | 80 | 80 | 80 | 80 | 80 | 80 | 72.8 | 69.2 | 69.2 | 69.2 | 73.3 | 73.3 | 69.2 |
| Mica (phr) | 0 | 0 | 0 | 0 | 0 | 0 | 0 | 0 | 10 | 15 | 15 | 15 | 0 | 0 | 15 |
| Mica Type | — | — | — | — | — | — | — | — | B | B | B | M | — | — | M |
| N880 (phr) | 0 | 0 | 0 | 0 | 0 | 0 | 0 | 0 | 0 | 0 | 0 | 0 | 0 | 6.21 | 0 |
| Sorbitan Monooleate | 0 | 0 | 0 | 0 | 0 | 0 | 4 | 8 | 0 | 0 | 4 | 8 | 0 | 0 | 0 |
| Accelerator 1 (phr) | 1.6 | 1.9 | 2.2 | 2.5 | 2.2 | 2.2 | 2.2 | 2.2 | 2.2 | 2.2 | 2.5 | 2.2 | 1.6 | 1.6 | 2.2 |
| Sulfur (phr) | 1.6 | 1.5 | 1.4 | 1.3 | 1.6 | 1.2 | 1.8 | 1.8 | 1.8 | 1.8 | 1.7 | 1.9 | 1.6 | 1.6 | 1.8 |
| Si69 (phr) | 8 | 8 | 8 | 8 | 4 | 12 | 0.8 | 0.8 | 0.8 | 0.8 | 0.8 | 0 | 8 | 8 | 0.8 |
| Accelerator 2 (phr) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |

B = BIOTITE
M = MUSCOVITE

TABLE XV

Physical Test Results
Partial Replacement of Silica with Mica

| Sample | C-Q | C-R | C-S | C-T | C-U | C-V | 40 |
|---|---|---|---|---|---|---|---|
| Mooney Viscometer | | | | | | | |
| $ML_{1+4}$ @ 100° C. | 82.9 | 78.4 | 79.8 | 81.3 | 119.7 | 68.1 | 129.1 |
| $T_{80}$ | 38.8 | 31.3 | 34.7 | 35 | 1154 | 17 | 730 |
| Monsanto Cure @ 170° C. | | | | | | | |
| ML | 12.81 | 12.46 | 12.08 | 12.46 | 19.82 | 10.03 | 24.59 |
| $TS_2$ | 2'29" | 2'29" | 2'34" | 2'31" | 2'07" | 2'18" | 2'17" |
| $TC_{90}$ | 13'16" | 11'36" | 9'29" | 7'37" | 17'43" | 11'03" | 17'52" |
| MH | 36.91 | 36.71 | 35.45 | 36.68 | 42.95 | 38.12 | 44.36 |
| Ring Tensile @ 23° C. | | | | | | | |
| 100% Modulus | 362 | 327 | 343 | 351 | 294 | 390 | 236 |
| Max. Stress (psi) | 2793 | 2537 | 2798 | 2760 | 2479 | 2521 | 2216 |
| Max. % Strain | 511 | 504 | 525 | 518 | 557 | 457 | 729 |
| Ring Tensile @ 100° C. | | | | | | | |
| 100% Modulus | 353 | 293 | 285 | 326 | 294 | 355 | 183 |
| Max. Stress (psi) | 1555 | 1464 | 1418 | 1538 | 1470 | 1386 | 1444 |
| Max. % Strain | 363 | 394 | 386 | 379 | 411 | 333 | 739 |
| Ring Tear @ 170° C. Strength (lb/in) | 245 | 257 | 243 | 237 | 233 | 280 | 176 |
| Pendulum Rebound 65° C. | 51.8 | 51.8 | 52.0 | 52.8 | 52.2 | 54.8 | 49.0 |
| Shore "A" Hardness | 72.0 | 69.0 | 70.0 | 70.0 | 72.0 | 70.0 | 68.0 |
| Rheometric @ 65 ° C. | | | | | | | |
| Tan δ @ 7% Strain | 0.1815 | 0.1834 | 0.1904 | 0.19 | .01707 | 0.1751 | 0.1837 |
| ΔG', MPa | 8.329 | 8.247 | 8.754 | 9.227 | 9.267 | 7.488 | 9.762 |
| Tensile Retraction | | | | | | | |
| $M_0$ ($\times 10^{-4}$), g/mol | 1.23 | 1.15 | 1.25 | 1.14 | 1.26 | 1.05 | 1.43 |
| Slope ($\times 10^{-3}$), g/mol | 3.06 | 3.07 | 3.16 | 3.09 | 3.73 | 2.86 | 4.95 |
| β ($\times 10^{-3}$), g/mol | 5.70 | 5.91 | 5.99 | 5.11 | 4.06 | 5.55 | 3.90 |

| Sample | 41 | 42 | 43 | 44 | 45 | C-V | C-W | 46 |
|---|---|---|---|---|---|---|---|---|
| Mooney Viscometer | | | | | | | | |
| $ML_{1+4}$ @ 100° C. | 103.5 | 135.7 | 122.0 | 92.7 | 76.6 | 69.8 | 73.6 | 123.6 |
| $T_{80}$ | 300 | 1510 | 592 | 109.5 | 27.2 | 18.7 | 21.4 | 1316.6 |
| Monsanto Cure @ 170° C. | | | | | | | | |
| ML | 19.28 | 26.83 | 23.03 | 16.46 | 13.63 | 10.03 | 10.37 | 22.59 |
| $TS_2$ | 2'39" | 1'53" | 1'57" | 2'30" | 3'13" | 2'27" | 2'20" | 1'49" |
| $TC_{90}$ | 15'24" | 18'45" | 18'24" | 13'16" | 12'10" | 12'06" | 10'49" | 18'45" |
| MH | 39.24 | 47.72 | 44.36 | 37.25 | 31.80 | 33.35 | 34.57 | 43.14 |
| Ring Tensile @ 23° C. | | | | | | | | |
| 100% Modulus | 191 | 273 | 258 | 205 | 166 | 237 | 265 | 271 |
| Max. Stress (psi) | 1916 | 2389 | 2281 | 2123 | 1559 | 2551 | 2796 | 2283 |
| Max. % Strain | 768 | 665 | 675 | 782 | 831 | 616 | 618 | 678 |
| Ring Tensile @ 100° C. | | | | | | | | |
| 100% Modulus | 151 | 208 | 231 | 176 | 134 | 268 | 287 | 280 |
| Max. Stress (psi) | 1296 | 1311 | 1402 | 1399 | 959 | 1392 | 1381 | 1242 |
| Max. % Strain | 821 | 585 | 584 | 745 | 826 | 433 | 414 | 530 |
| Ring Tear @ 170° C. Strength (lb/in) | 278 | 272 | 247 | 267 | 212 | 260 | 246 | 237 |
| Pendulum Rebound 65° C. | 46.8 | 51.8 | 53.0 | 51.4 | 47.6 | 53 | 52.8 | 51.6 |
| Shore "A" Hardness | 66.0 | 75.0 | 70.0 | 65.0 | 62.0 | 67.0 | 69.0 | 75.0 |
| Rheometric @ 65 ° C. | | | | | | | | |
| Tan δ @ 7% Strain | 0.1935 | 0.1791 | 0.1798 | 0.1819 | 0.1932 | 0.1851 | 0.1792 | 0.1701 |
| ΔG', MPa | 8.351 | 9.676 | 8.826 | 7.022 | 5.185 | 5.749 | 5.656 | 10.165 |
| Tensile Retraction | | | | | | | | |
| $M_0$ ($\times 10^{-4}$), g/mol | 1.6 | 1.26 | 1.29 | 1.59 | 1.87 | 1.10 | 1.10 | 1.26 |
| Slope ($\times 10^{-3}$), g/mol | 5.63 | 4.69 | 5.12 | 5.53 | 7.03 | 2.93 | 2.98 | 4.94 |
| β ($\times 10^{-3}$), g/mol | 4.07 | 3.42 | 4.35 | 5.61 | 7.95 | 6.35 | 6.72 | 4.02 |

TABLE XVI describes additional variations in formulation as well as including other types of mica. The particular mica was unimportant in the $ML_4$ reduction which ranged from about 12 to 14 points at 15 parts mica per 100 rubber, shown in TABLE XVII. Nor, were there significant effects of mica type on ML or $T_{80}$ reductions. The mica stocks showed higher rebound and reduced tan δ values at comparable states of cure as judged from tensile properties. Hardness values indicated a lower state of cure for the mica stocks; however, a change of filler type may not allow direct comparison of hardness to judge state of cure.

TABLE XVIII lists the results of controlled mix studies into which a known energy input was applied to a mix after the Si69 was added in the presence of mica, talc, and/or sorbitan monooleate. It has been established that β, an inverse measure of filler association or crosslink density, as determined by tensile retraction, can be increased by more mixing energy. This effect can be calculated from the slope

TABLE XVI

Partial Silica Replacement with Mica Change of Cure System

| Sample | C-X | C-Y | C-Z | C-AA | 47 | 48 | 49 | 50 | 51 | C-BB |
|---|---|---|---|---|---|---|---|---|---|---|
| Recipe Per Previous Stock | C-P | C-P | C-P | C-P | C-P | C-P | C-P | C-P | C-P | C-P |
| ZnO (phr) | 1.70 | 2.40 | 3.00 | 3.00 | 1.70 | 1.70 | 1.70 | 3.00 | 3.00 | 1.70 |
| Stearic Acid (phr) | 1.00 | 1.00 | 1.00 | 2.00 | 1.00 | 1.00 | 1.00 | 1.00 | 1.00 | 1.00 |
| Silica (phr) | 80 | 80 | 80 | 80 | 69.2 | 69.2 | 69.2 | 69.2 | 69.2 | 80 |
| Mica Muscovite (phr) | 0 | 0 | 0 | 0 | 15 | 0 | 0 | 0 | 0 | 0 |
| Water Ground 325 Mesh Mica Muscovite (phr) | 0 | 0 | 0 | 0 | 0 | 15 | 0 | 0 | 0 | 0 |
| C3000-SM-M (phr) Silane Treated | 0 | 0 | 0 | 0 | 0 | 0 | 15 | 15 | 15 | 0 |
| Si69/CB Mixture (1:1) (phr) | 16 | 16 | 16 | 16 | 16 | 16 | 16 | 16 | 0(*) | 16 |
| Sulfur (phr) | 1.40 | 1.40 | 1.40 | 1.40 | 2.20 | 2.20 | 2.20 | 2.20 | 2.20 | 2.20 |

(*) Add 8.0 phr N330 Carbon Black to Compensate for that in 16.00 phr

TABLE XVII

Physical Test Results
Effect of Presence of Mica, Type of Mica and of Cure System
Variations at Constant Mixing Energy Input (238.4 w-hrs/lb)

| Sample | C-X | C-Y | C-Z | C-AA | 47 | 48 | 49 | 50 | 51 | C-BB |
|---|---|---|---|---|---|---|---|---|---|---|
| Mooney Viscometer | | | | | | | | | | |
| $ML_{1+4}$ 100° C. | 75.7 | 73.4 | 74.5 | 71.5 | 58.7 | 60.1 | 60.4 | 60.2 | 125.1 | 72.7 |
| $T_{80}$ | 24.1 | 22.7 | 24.1 | 22.4 | 19.7 | 15.9 | 15.6 | 14.6 | >300.6 | 26.1 |
| Monsanto Cure (170° C.) | | | | | | | | | | |
| ML | 11.6 | 11.17 | 11.36 | 10.59 | 8.94 | 8.85 | 9.38 | 8.60 | 25.86 | 10.97 |
| $TS_2$ | 2'30" | 2'31" | 2'36" | 2'42" | 2'19" | 2'21" | 2'18" | 2'27" | 2'11" | 2'12" |
| $TC_{90}$ | 10'01" | 9'43" | 10'11" | 8'49" | 11'01" | 10'49" | 11'07" | 11'53" | 20'49" | 12'55" |
| MH | 37.37 | 37.08 | 37.70 | 35.43 | 39.44 | 39.16 | 40.70 | 38.43 | 48.24 | 41.52 |
| Ring Tensile @ 23° C. | | | | | | | | | | |
| 100% Modulus | 318 | 333 | 327 | 301 | 393 | 430 | 387 | 368 | 256 | 368 |
| MAX. Stress (psi) | 2809 | 3107 | 2927 | 2819 | 2604 | 2766 | 2681 | 2452 | 1886 | 2714 |
| Energy To Break (psi) | 6596 | 7435 | 7132 | 7038 | 5540 | 5977 | 5989 | 5212 | 5293 | 5399 |
| Ring Tensile @ 100° C. | | | | | | | | | | |
| 100% Modulus | <268 | 276 | 281 | 248 | 321 | 347 | 366 | 341 | 220 | 366 |
| Max. Stress (psi) | 1263 | 1631 | 1503 | 1483 | 1093 | 1255 | 1376 | 1436 | 1212 | 1811 |
| Max. % Strain | 364 | 439 | 417 | 451 | 324 | 334 | 341 | 368 | 671 | 361 |
| Ring Tear @ 170° C. Tear Strength (lb/in) | 276 | 307 | 305 | 322 | 253 | 253 | 261 | 246 | 240 | 253 |
| Pendulum Rebound 65° C. | 53.6(*) | 53.0(*) | 54.8 | 53.6 | 59.6 | 58.8 | 58.8 | 58.6 | 51.2 | 55.8 |
| Shore "A" Hardness | 65.0 | 67.0 | 67.0 | 68.0 | 68.0 | 68.0 | 67.0 | 68.0 | 72.0 | 70.0 |
| Rheometrics @ 65° C. | | | | | | | | | | |
| Tan δ @ 7% Strain | 0.1839 | 0.1868 | 0.1764 | 0.1855 | 0.1436 | 0.1458 | 0.1471 | 0.1480 | 0.1679 | 0.1875 |
| ΔG', MPa | 6.881 | 6.167 | 5.950 | 5.290 | 4.745 | 5.146 | 5.063 | 4.792 | 10.08 | 5.831 |

(*) Samples not well molded of 33.99 g/mol mix energy, and intercept, 1349 g/mol, (see drawing FIGURE) and applied to the mix energy supplied to the samples.

The data in TABLE XVIII have been sorted by increasing Si69, Mica, and Talc in that order. The Δβ value, the increase in β over that expected, increased with Si69 and the Mica and Talc level and have thusly been grouped. The two exceptions were the combination of Mica (15 parts) with sorbitan monooleate (8 parts) and the sorbitan monooleate alone (8 parts) which showed much higher β than expected from mix energy calculations alone.

Further testing of silica-filled vulcanizable elastomeric compounds was conducted to determine the effect of mineral fillers and the use of polyoxyethylene derivatives of fatty acid esters of hydrogenated and non-hydrogenated sugars as processing aids in the stock formulations. These examples are described in TABLE XIX with the results of the tests conducted to evaluate and compare physical properties. As a Control, Sample C-F was prepared as above, without any fatty acid ester additives. The ethoxylated species (Tweens)

TABLE XVIII

Tensile Retraction of Controlled Energy Mixes
Energy After Si69 was Added to a 280 g Brabender

| Sample | Mr g/mol | S g/mol | S/Mr | β g/mol | Energy W/H | Si69 phr | Sulfur phr |
|---|---|---|---|---|---|---|---|
| 45 | 16700 | 7034 | 0.421 | 7947 | 112.17 | 0 | 1.9 |
| 42 | 109.13 | 4910 | 0.450 | 2057 | 72.73 | 0.8 | 2 |
| 40 | 14270 | 4945 | 0.347 | 3899 | 106.13 | 0.8 | 1.8 |
| 52 | 16040 | 5626 | 0.351 | 4069 | 103.83 | 0.8 | 1.8 |
| 41 | 11387 | 2686 | 0.236 | 5811 | 75.40 | 0.8 | 2 |
| 42 | 12630 | 4690 | 0.371 | 3415 | 101.44 | 0.8 | 1.8 |
| 53 | 12640 | 4944 | 0.391 | 4022 | 104.93 | 0.8 | 1.8 |
| 46 | 12930 | 5122 | 0.396 | 4354 | 113.16 | 0.8 | 1.8 |
| 44 | 15875 | 5532 | 0.348 | 5615 | 123.10 | 0.8 | 1.7 |
| 39 | 10475 | 2547 | 0.243 | 5697 | 147.00 | 8 | 2.2 |
| 47 | 12184 | 3247 | 0.268 | 6668 | 147.00 | 8 | 1.4 |
| C-Y | 10980 | 2928 | 0.267 | 6346 | 117.05 | 8 | 1.6 |
| C-X | 12304 | 3061 | 0.249 | 5702 | 93.51 | 8 | 1.6 |
| 48 | 12890 | 3010 | 0.234 | 5579 | 80.37 | 8 | 1.8 |
| C-W | 11040 | 2980 | 0.270 | 6716 | 109.72 | 8 | 1.6 |
| C-P | 12656 | 3130 | 0.247 | 6058 | 87.65 | 8 | 1.6 |
| 35 | 12398 | 3352 | 0.270 | 6835 | 88.70 | 8 | 1.6 |
| 36 | 12690 | 3443 | 0.271 | 7380 | 96.59 | 8 | 1.6 |
| 37 | 12491 | 3270 | 0.262 | 6706 | 89.88 | 8 | 1.6 |
| 38 | 12579 | 3423 | 0.272 | 7880 | 92.61 | 8 | 1.6 |
| 54 | 9111 | 3098 | 0.340 | 8289 | 147.00 | 8 | 2.2 |
| C-BB | 9299 | 3082 | 0.331 | 8309 | 147.00 | 8 | 2.2 |
| 48 | 9348 | 3155 | 0.338 | 8630 | 147.00 | 8 | 2.2 |
| 49 | 9849 | 3141 | 0.319 | 8708 | 147.00 | 8 | 2.2 |

| Sample | ACC phr | MICA phr | TALC phr | SO phr | CALC β g/mol | ΔB g/mol |
|---|---|---|---|---|---|---|
| 45 | 3.0 | 15 | 0 | 8 | 5161 | 2786 |
| 42 | 2.4 | 0 | 0 | 0 | 3820 | −1763 |
| 40 | 3.0 | 0 | 0 | 4 | 4956 | −1057 |
| 52 | 3.0 | 0 | 0 | 8 | 4878 | −809 |
| 41 | 2.4 | 0 | 0 | 8 | 3912 | 1899 |
| 42 | 3.0 | 10 | 0 | 0 | 4796 | −1381 |
| 53 | 3.0 | 15 | 0 | 0 | 4915 | −893 |
| 46 | 3.0 | 15 | 0 | 0 | 5195 | −841 |
| 44 | 3.0 | 15 | 0 | 4 | 5533 | 82 |
| 39 | 2.4 | 0 | 0 | 0 | 6345 | −648 |
| 47 | 3.0 | 0 | 0 | 0 | 6345 | 323 |
| C-Y | 2.4 | 0 | 0 | 0 | 5327 | 1019 |
| C-X | 2.4 | 0 | 0 | 0 | 4527 | 1175 |
| 48 | 3.0 | 0 | 0 | 0 | 4080 | 1499 |
| C-W | 2.4 | 0 | 0 | 0 | 5078 | 1638 |
| C-P | 2.4 | 0 | 2 | 0 | 4328 | 1730 |
| 35 | 2.4 | 0 | 5 | 0 | 4363 | 2472 |
| 36 | 2.4 | 0 | 10 | 0 | 4632 | 2748 |
| 37 | 2.4 | 5 | 0 | 0 | 4403 | 2303 |
| 38 | 2.4 | 10 | 0 | 0 | 4496 | 3384 |
| 54 | 2.4 | 15 | 0 | 0 | 6345 | 1944 |
| C-BB | 2.4 | 15 | 0 | 0 | 6345 | 1964 |
| 48 | 2.4 | 15 | 0 | 0 | 6345 | 2285 |
| 49 | 2.4 | 15 | 0 | 0 | 6345 | 2363 |

It is therefore unexpected that mica and talc should decrease the filler interaction and increase β as their levels were increased. Further, sorbitan monooleate, alone and in concert with mica, acted to increase the observed β and thus reduce filler interaction.

are presented as Samples 52, 54, 55 and 59 and are compared against analogous sorbitans (Spans, non-ethoxylated), Samples 53, 56, 57 and 58. The Samples contained carbon black 35 phr, 30 phr of silica and 3 parts by weight of Si69

(10 percent per weight of silica) and were prepared with the formulation as set forth in Table VI, Sample C-F, to which the processing aids of Table XIX were added. The processing aids included Spans (fatty acid esters) and Tweens (polyoxyethylene fatty acid esters).

below. Example Nos. 61–65 indicated a Mooney viscosities (ML 1+4/100° C.) comparable to the control, C-DD, with 3 phr of Si69 processing aid. Tensile properties of the cured elastomeric stocks, containing processing aids comprising octyl triethoxy silane and sorbitan oleate supported on silica

TABLE XIX

Physical Test Results
Effect of Partial Replacement of Silica with Sorbitan Esters

| Sample | C-F | 52 | 53 | 54 | 55 | 56 | 57 | 58 | 59 |
|---|---|---|---|---|---|---|---|---|---|
| Additive | — | Tween 80 | Span 80 | Tween 60 | Tween 85 | Span 60 | Span 85 | Span 80 | Tween 80 |
| Level, phr | — | 3 | 3 | 3 | 3 | 3 | 3 | 1.5 | 1.5 |
| Mooney Viscosity | | | | | | | | | |
| $ML_{1+4}$ 100° C. | 60.3 | 52 | 50.2 | 53.8 | 50.5 | 49.5 | 52.3 | 53.5 | 56.7 |
| $T_{80}$ | 7.8 | 6.7 | 6.7 | 6.7 | 5.3 | 5.4 | 5.7 | 5.7 | 6 |
| Monsanto Cure (165° C.) | | | | | | | | | |
| ML* | 2.56 | 2.34 | 1.87 | 2.43 | 7.25 | 8.52 | 7.25 | 7.44 | 8.17 |
| $TS_2$ | 2'58" | 3'27" | 3'30" | 3'33" | 4'47" | 4'41" | 4'27" | 4'22" | 4'38" |
| $TC_{90}$ | 9'43" | 11'46' | 11'29" | 11'56" | 14'38" | 13'34" | 12'16" | 12'25" | 11'56" |
| MH* | 15.69 | 16.42 | 14.68 | 17.94 | 40.36 | 37.88 | 37.88 | 38.55 | 41.67 |
| Ring Tensile @ 24° C. | | | | | | | | | |
| 100% Modulus | 465 | 485 | 600 | 472 | 363 | 446 | 393 | 383 | 394 |
| MAX. Stress (psi) | 2278 | 2264 | 3595 | 2218 | 3274 | 2956 | 2961 | 2706 | 2466 |
| Energy To Break (in-lbs/in$^3$) | 3374 | 3398 | 6380 | 3384 | 4169 | 5403 | 5705 | 4965 | 4319 |
| Ring Tensile @ 100° C. | | | | | | | | | |
| 100% Modulus | 371 | 387 | 379 | 375 | 329 | 298 | 315 | 338 | 346 |
| Max. Stress (psi) | 1228 | 1255 | 1268 | 1272 | 1492 | 1216 | 1417 | 1437 | 1389 |
| Max. % Strain | 257 | 251 | 260 | 263 | 311 | 288 | 313 | 304 | 286 |
| Ring Tear @ 171° C. | — | — | — | — | 112 | 148 | 123 | 124 | 118 |
| Tear Strength (lb/in) | | | | | | | | | |
| Pendulum Rebound 65° C. | 51.4 | 53 | 52 | 53 | 50.2 | 50 | 51.8 | 50.6 | 50.8 |
| Rheometrics | | | | | | | | | |
| Tan δ @ 7% Strain | 0.1389 | 0.1207 | 0.1232 | 0.1088 | 0.1155 | 0.1214 | 0.1209 | 0.1319 | 0.1266 |
| ΔG', MPa at 65° C. | 2.752 | 2.922 | 2.243 | 2.551 | 2.417 | 2.475 | 2.144 | 2.45 | 2.697 |

(*)ML and MH values for Samples C-F and 52–54 were measured on a Monsanto MDR 2000 rheometer and ML and MH values for Samples 55–59 were measured on a Monsanto ODR rheometer.

As is apparent from the physical properties reported in Table XIX, the ethoxylated sorbitans (Tweens) provided improved properties over the Control and generally performed as well as the sorbitans (Spans). All aids were fairly well equivalent, showing reduced Mooney viscosity and torque while desired physical properties remained. Unexpectedly, the need for adjacent hydroxyls in the sorbitan molecule, as taught by Canadian Pat. No. 2,184,932 to Semerit, was found to be unfounded as the use of tri-oleates, which contain only a single hydroxyl, were effective in producing processability as was equally true for the polysorbates which are polyethoxylated and thus, contain no adjacent hydroxyls.

Further testing of silica-filled vulcanizable elastomeric compounds was conducted to determine the effect silica-supported and carbon black-supported alkyl alkoxysilanes and polyoxyethylene derivatives of fatty acid esters of hydrogenated and non-hydrogenated sugars as processing aids in the elastomeric stock formulations. The basic formulation, C-CC, of the elastomeric stock formulation is shown and described in Table XX below.

The physical properties of the Example Nos. 60–65 and the control, C-DD, are shown and described in Table XXI, are comparable to the tensile properties of the control elastomeric stock formulation, C-DD, containing 3 phr of Si69 processing aid. Curing at 171° C. for 20 minutes was used to obtain the physical properties set forth below.

TABLE XX

Basic Formulation of Elastomeric Stock (C-CC)

| Component | Parts |
|---|---|
| SBR | 75 |
| NR | 25 |
| Oil | 15 |
| carbon black | 35 |
| silica | VARIABLE |
| stearic acid | 1.5 |
| wax | 1.0 |
| process aid | VARIABLE |
| antioxidant | 0.95 |
| sulfur | 1.7 |
| CBS | 1.5 |
| DPG | 0.5 |
| Zinc oxide | 2.5 |

TABLE XX-continued

Final Elastomeric Stock Formulations

| Component | C-DD | 60 | 61 | 62 | 63 | 64 | 65 |
|---|---|---|---|---|---|---|---|
| 46% SO on Silica[a] | — | 3.3 | 3.3 | — | — | — | — |
| 47% SO on Silica[b] | — | 1.5 | 2.5 | — | — | — | — |
| 5% SO/3.8% OS on Silica[c] | — | — | — | 32.9 | — | — | — |
| 5% SO/3.8% OS on Silica[d] | — | — | — | — | 32.9 | — | — |
| Sorbitan Oleate (SO) | — | — | — | — | — | 1.65 | 1.65 |
| Octyl triethoxysilane (OS) | — | — | — | — | — | 1.25 | 1.25 |

[a]Flogard SP (712-090)
[b]Flogard SP (712-091)
[c]Flogard SP (712-097)
[d]HiSil (712-098)

Further testing of silica-filled vulcanizable elastomeric stock formulations was conducted to determine the effects of the silica and carbon black-supported processing aids on the physical properties and processability of the elastomeric formulations after six months of ambient storage.

The elastomeric stock formulations were prepared according to Table XXII, below, and the physical properties were evaluated after curing at 170° C. for 20 minutes, followed by six months of ambient aging. The data for the physical properties and processability of the elastomeric formulations for the ambient aging study are shown in Table XXIII, below.

TABLE XXI

Physical Properties of Elastomeric Formulations

| Example | C-DD | 60 | 61 | 62 | 63 | 64 | 65 |
|---|---|---|---|---|---|---|---|
| Mooney Viscosity | | | | | | | |
| ML 1 + 4/100° C. | 77.6 | 132.4 | 75.2 | 77.9 | 80.8 | 64.6 | 72.9 |
| T80 | 9.7 | 43.5 | 7.5 | 8.5 | 9.3 | 6.5 | 7.4 |
| MDR Monsanto Cure at 165° C. | | | | | | | |
| ML | 11.01 | 3.86 | 3.48 | 3.7 | 3.75 | 3.13 | 3.32 |
| MH | 35.37 | 20.42 | 19.39 | 19.67 | 20.28 | 18.89 | 19.1 |
| ts2 | 2:36 | 2:08 | 2:16 | 2:26 | 2:16 | 2:22 | 2:24 |
| tc90 | 17:06 | 13:55 | 11:14 | 10:37 | 11:14 | 10:41 | 10:02 |
| tan δ at MH | — | 0.144 | 0.145 | 0.158 | 0.15 | 0.134 | 0.135 |
| Ring Tensile at 24° C. | | | | | | | |
| 50% Modulus, psi | 221 | 256 | 230 | 209 | 219 | 207 | 227 |
| 100% Modulus, psi | 322 | 403 | 360 | 331 | 356 | 331 | 360 |
| 200% Modulus, psi | 615 | 819 | 766 | 678 | 739 | 697 | 765 |
| 300% Modulus, psi | 1008 | 1407 | 1338 | 1177 | 1279 | 1234 | 1335 |
| Tensile Strength, psi | 1852 | 2082 | 1899 | 1726 | 1959 | 1840 | 1886 |
| % Elongation | 474 | 400 | 386 | 392 | 407 | 395 | 381 |
| Break energy, in-lbs/in$^2$ | 4012 | 3762 | 3229 | 3013 | 3549 | 3156 | 3166 |
| Ring Tensile at 100° C. | | | | | | | |
| 50% Modulus, psi | 189 | 229 | 208 | 212 | 196 | 193 | 190 |
| 100% Modulus, psi | 263 | 350 | 323 | 312 | 303 | 296 | 300 |
| 200% Modulus, psi | 518 | 685 | 654 | 632 | 607 | 614 | 604 |
| 300% Modulus, psi | 869 | 1140 | 1107 | 1022 | 1025 | 1070 | 1023 |
| Tensile Strength, psi | 1299 | 1248 | 1227 | 1203 | 1075 | 1097 | 1148 |
| % Elongation | 412 | 322 | 322 | 327 | 310 | 308 | 326 |
| Break energy, in-lbs/in$^2$ | 2496 | 1894 | 1837 | 1813 | 1557 | 1552 | 1761 |
| Ring Tear at 171° C., psi | 184.9 | 175.6 | 140.8 | 152.2 | 108.2 | 118.4 | 154 |
| Wet Stanley London(#/std) | 59/53 | 57/52 | 57/52 | 58/52 | 58/52 | 57/52 | 57/52 |
| Shore A, at RT | — | 72 | 70 | 67 | 67 | 67 | 66 |
| Shore A at 50° C. | — | 67 | 67 | 65 | 67 | 66 | 65 |
| Rheometrics at 7% Strain | | | | | | | |
| tan C at 24° C. | 0.193 | 0.195 | 0.169 | 0.173 | 0.175 | 0.166 | G.180 |
| δ G' × 10$^{-7}$ at 24° C. | 4.239 | 4.506 | 4.879 | 5.267 | 4.718 | 3.94 | 4.712 |
| 24° C. G' × 10$^{-7}$ at 14.5% | 3.006 | 3.138 | 3.261 | 3.01 | 3.127 | 2.856 | 3.422 |
| tan δ at 65° C. | 0.152 | 0.153 | 0.155 | 0.143 | 0.145 | 0.138 | 0.149 |
| 5 G' × 10$^{-7}$ at 65° C. | 2.689 | 3.779 | 5.667 | 3.939 | 4.554 | 4.172 | 3.836 |
| 50° C. G' × 10$^{-7}$ at 14.5% | 2.42 | 2.736 | 2.77 | 2.731 | 2.992 | 2.509 | 2.6 |
| Mr, g/mol from Tensile Retraction | 13680 | 10440 | — | 11320 | — | — | — |

TABLE XXII

Basic Formulation of Elastomeric Stock (C-CC)

| Component | Parts |
|---|---|
| SBR | 75 |
| NR | 25 |
| Oil | 15 |
| carbon black | 35 |
| silica | VARIABLE |
| stearic acid | 1.5 |
| wax | 1.0 |
| process aid | VARIABLE |
| antioxidant | 0.95 |
| sulfur | 1.7 |
| CBS | 1.5 |
| DPG | 0.5 |

Final Elastomeric Stock Formulations

| Example | 66 | 67 | 68 | 69 | 70 | 71 |
|---|---|---|---|---|---|---|
| 46% SO on Silica[a] | 3.3 | 3.3 | — | — | — | — |
| 47% SO on Silica[b] | — | — | 2.5 | — | — | — |
| 5% SO 13.8% OS on Silica[c] | — | — | — | 32.9 | — | — |
| 5% SO/3.8% OS on Silica[d] | — | — | — | — | 32.9 | — |
| Sorbitan Oleate (SO) | — | — | — | — | 1.65 | 1.65 |
| Octyl triethoxysilane (OS) | 1.25 | — | — | — | 1.25 | 1.25 |

TABLE XXIII

Physical Properties of Elastomeric Formulations After Ambient aging for 6 months

| | 66 | 67 | 68 | 69 | 70 | 71 |
|---|---|---|---|---|---|---|
| Mooney Viscosity | | | | | | |
| ML 1 +4/100° C. | 77 | 80.8 | 78.9 | 78.9 | 74.8 | 78.1 |
| MDR Monsanto Cure at 165° C. | | | | | | |
| ML | 2.97 | 3.62 | 3.5 | 3.69 | 3.29 | 3.47 |
| MH | 16.12 | 19.65 | 19.02 | 19.62 | 18.72 | 16.49 |
| ts2 | 2:52 | 2:42 | 3:04 | 3:05 | 2:49 | 2:54 |
| tc90 | 14:27 | 10:47 | 9:37 | 9:11 | 9:41 | 14:00 |
| tan δ at MH | 0.2 | 0.093 | 0.102 | 0.103 | 0.091 | 0.189 |
| Ring Tensile at 24° C. | | | | | | |
| 50% Modulus, psi | 181 | 159 | 172 | 166 | 171 | 165 |
| 100% Modulus, psi | 333 | 286 | 316 | 296 | 310 | 294 |
| 200% Modulus, psi | 778 | 676 | 754 | 691 | 740 | 696 |
| 300% Modulus, psi | 1415 | 1242 | 1389 | 1273 | 1375 | 1288 |
| Tensile Strength, psi | 2551 | 2233 | 2442 | 2298 | 2548 | 2438 |
| % Elongation | 448 | 445 | 441 | 447 | 454 | 461 |
| Break energy, in-lbs/in$^2$ | 4735 | 4088 | 4521 | 4235 | 4731 | 4605 |

Physical Properties of Elastomeric Formulations-aging

| Example | 66 | 67 | 68 | 69 | 70 | 71 |
|---|---|---|---|---|---|---|
| Ring Tensile at 100° C. | | | | | | |
| 50% Modulus, psi | 131 | 131 | 146 | 153 | 146 | 139 |
| 100% Modulus, psi | 244 | 240 | 267 | 274 | 266 | 250 |
| 200% Modulus, psi | 541 | 532 | 596 | 596 | 590 | 546 |
| 300% Modulus, psi | 973 | 963 | 1073 | 1076 | 1069 | 982 |
| Tensile Strength, psi | 1285 | 1400 | 1356 | 1433 | 1430 | 1396 |
| % Elongation | 367 | 394 | 356 | 369 | 371 | 388 |
| Break energy, in-lbs/in$^2$ | 2024 | 2353 | 2069 | 2266 | 2270 | 2330 |
| New Lambourn at 65%, g lost | 179 | 181 | 157 | 147 | 158 | 149 |
| New Lambourn at 65%, INDEX | 0.145 | 0.148 | 0.1456 | 0.1506 | 0.1454 | 0.1481 |

TABLE XXIII-continued

| | | | | | | |
|---|---|---|---|---|---|---|
| Ring Tear at 171° C., psi | 0.97 | 0.95 | 0.96 | 0.93 | 0.96 | 0.95 |
| Wet Stanley London(#/std) | 53/48.5 | 57/48.5 | 53/48.5 | 53/48.5 | 56/48.5 | 53/48 |
| Shore A, at RT | 66.4 | 67 | 67.7 | 67.5 | 65.8 | 64.1 |
| Shore A at 50° C. | 63.6 | 64.3 | 64.8 | 64.9 | 63.9 | 64.1 |
| Rheometrics at 7% Strain | | | | | | |
| tan δ at 24° C. | 0.1779 | 0.169 | 0.181 | 0.1843 | 0.159 | 0.1724 |
| 24° C. G' × $10^{-7}$ at 7% | 0.628 | 0.605 | 0.657 | 0.739 | 0.491 | 0.577 |
| δ G' × $10^{-7}$ at 24° C. | 4.772 | 4.224 | 5.233 | 5.909 | 3.13 | 4.087 |
| 24° C. G' × $10^{-7}$ at 14.5% | 2.652 | 2.779 | 2.779 | 3.009 | 2.48 | 2.572 |
| tan δ at 50° C. | 0.15 | 0.1391 | 0.1524 | 0.1544 | 0.1417 | 0.1412 |
| 50° C. G' × $10^{-7}$ at 7% | 0.462 | 0.441 | 0.482 | 0.521 | 0.38 | 0.401 |
| δ G' × $10^{-7}$ at 50° C. | 3.648 | 3.374 | 3.941 | 4.428 | 2.829 | 2.995 |
| 50° C. G' × $10^{-7}$ at 14.5% | 2.417 | 2.536 | 2.477 | 2.644 | 2.151 | 2.281 |

It is apparent from the data contained in Table XXIII, above, that elastomeric formulations containing a silica-supported or carbon black-supported processing aid selected from the group consisting of an alkyl alkoxysilane, fatty acid ester of hydrogenated or non-hydrogenated $C_5$ and $C_6$ sugars, e.g., sorbitan, and ethoxylated derivatives of fatty acid esters of these sugars provide physical properties, after six months of ambient aging, comparable to the control elastomeric formulation containing 3 phr of Si69 as a processing aid (C-DD).

Thus, it should be evident that the process of the present invention is useful in improving the processability of formulations of diene polymer elastomers containing silica filler by reducing the viscosity of silica-filled elastomeric vulcanizable compounds. It is further demonstrated that the present invention provides vulcanizable silica-filled elastomeric compounds having enhanced physical properties. Practice of the present invention allows a reduction of Si69 which is added to vulcanizable rubber compositions containing silica fillers. The reduction can be effected by the addition of the processing aids described herein, mineral and non-mineral fillers as well as combinations of more than one.

It will be appreciated that the processing aids and additional fillers exemplified herein have been provided to demonstrate practice of the invention and are otherwise not to be construed as a limitation on practice of the present invention. Moreover, the processing aids and mineral fillers disclosed herein have been provided for purposes of exemplification only and thus, it is to be appreciated that other materials can be substituted without falling outside of the scope of this invention. Those skilled in the art can readily determine suitable additives and the appropriate manner of formulating elastomeric compositions containing silica fillers. Furthermore, practice of the present invention is not limited to a specific formulation of elastomers.

Based upon the foregoing disclosure, it should now be apparent that the process and related components described herein will carry out the objects set forth hereinabove. It is, therefore, to be understood that any variations evident fall within the scope of the claimed invention and thus, the selection of specific component elements can be determined without departing from the spirit of the invention herein disclosed and described. Thus, the scope of the invention shall include all modifications and variations that may fall within the scope of the attached claims.

We claim:

1. A pneumatic tire comprising a tread stock containing a silica-filled sulfur-vulcanized compound that comprises 100 parts by weight of an elastomer; about 5 to about 100 parts by weight of a reinforcing filler selected from the group consisting of silica and mixtures thereof with carbon black; a processing aid selected from the group consisting of zero to about 5 percent by weight of bis(3-triethoxysilylpropyl) tetrasulfide, based on the weight of the silica, an alkylalkoxysilane, fatty acid esters of hydrogenated or non-hydrogenated $C_5$ and $C_6$ sugars; polyoxyethylene derivatives of fatty acid esters of hydrogenated or non-hydrogenated $C_5$ and $C_6$ sugars; and mixtures thereof, and a cure agent comprising a sufficient amount of sulfur to achieve a satisfactory cure of the compound, as measured by a cured property selected from the group consisting of the 300% Modulus and the molecular weight between crosslinks, $M_c$.

2. The tire of claim 1, further comprising about one to about 40 phr of a non-reinforcing filler selected from the group consisting of mica, talc, urea, clay, sodium sulfate, and mixtures thereof.

3. The tire of claim 2, wherein the processing aid is supported on at least some of either the reinforcing filler or the non-reinforcing filler.

4. The tire of claim 3, wherein the silica or carbon black-supported processing aid is provided as a 50/50 mixture of processing aid and support.

5. The tire of claim 1, wherein the elastomer is selected from the group consisting of homopolymers of a conjugated diene monomer and copolymers comprising monomer units derived from a conjugated diene monomer and a monomer unit selected from the group consisting of monovinyl aromatic monomers and triene monomers.

6. The tire of claim 1, wherein the elastomer is styrene-butadiene rubber.

7. The tire of claim 1, wherein the elastomer is a copolymer of styrene-butadiene rubber and butyl rubber.

8. The tire of claim 1, further comprising a natural rubber.

9. The tire of claim 1, wherein the elastomer contains a functional group derived from a polymerization initiator.

10. The tire of claim 1, wherein the elastomer contains a functional group derived from a terminating agent.

11. The tire of claim 10, wherein the terminating agent has the formula $(R_1)_a ZX_b$, and mixtures thereof, wherein Z is tin or silicon, $R_1$ is selected from the group consisting of an alkyl having from about 1 to about 20 carbon atoms; a cycloalkyl having from about 3 to about 20 carbon atoms; an aryl having from about 6 to about 20 carbon atoms; and an aralkyl having from about 7 to about 20 atoms; X is a halogen or an alkoxy group; "a" is from 0 to 3, and "b" is from 1 to 4, and a+b=4.

12. The tire of claim 1, wherein when the carbon black reinforcing filler is not present, at least 30 parts by weight of silica is employed.

13. The tire of claim 1, wherein the alkylakoxysilane is represented by the formula $(R_1)_2 Si(OR_2)_2$ or $R_1 Si(OR_2)_3$, wherein each $R_1$ independently is selected from the group consisting of C1 to about C18 aliphatic, about C6 to about C12 cycloaliphatic, and about C6 to about C18 aromatic; and, wherein the alkoxy groups are the same or are different from each other, each $R_2$ independently containing from one to about 6 carbon atoms.

14. The tire of claim 1, wherein the alkylalkoxysilane is octyltriethoxysilane.

15. The tire of claim 1, wherein the fatty acid esters are selected from the group consisting of sorbitan monooleate, sorbitan dioleate, sorbitan trioleate, sorbitan sesquioleate, sorbitan laurate, sorbitan palmitate, and sorbitan stearate.

16. The tire of claim 1, wherein the polyoxyethylene derivatives of the fatty acid esters of the hydrogenated and non-hydrogenated $C_5$ and $C_6$ sugars are selected from the group consisting of POE (20) sorbitan stearate; POE (20) sorbitan oleate; POE (20) sorbitan trioleate; POE (20) sorbitan sesquioleate; POE (20) sorbitan laurate, and POE (20) sorbitan palmitate.

17. The tire of claim 1, wherein the amount of the alkylalkoxysilane, the fatty acid ester, or the polyoxyethylene derivative, when present, is about 0.1 percent to about 150 percent by weight, based on the weight of the silica.

* * * * *